United States Patent
Pechanek

(10) Patent No.: US 7,581,079 B2
(45) Date of Patent: Aug. 25, 2009

(54) PROCESSOR COMPOSED OF MEMORY NODES THAT EXECUTE MEMORY ACCESS INSTRUCTIONS AND COOPERATE WITH EXECUTION NODES TO EXECUTE FUNCTION INSTRUCTIONS

(76) Inventor: Gerald George Pechanek, 107 Stoneleigh Dr., Cary, NC (US) 27511

( * ) Notice: Subject to any disclaimer, the term of this patent is extended or adjusted under 35 U.S.C. 154(b) by 235 days.

(21) Appl. No.: 11/277,507

(22) Filed: Mar. 26, 2006

(65) Prior Publication Data

US 2006/0218376 A1 Sep. 28, 2006

Related U.S. Application Data

(60) Provisional application No. 60/665,668, filed on Mar. 28, 2005, provisional application No. 60/687,719, filed on Jun. 6, 2005.

(51) Int. Cl.
 *G06F 15/163* (2006.01)
(52) U.S. Cl. .................... 712/10; 712/11; 712/14; 712/16; 712/28
(58) Field of Classification Search .............. 712/10, 712/11, 28
 See application file for complete search history.

(56) References Cited

U.S. PATENT DOCUMENTS 4,491,937 A * 1/1985 Chan .................... 365/154
5,974,531 A * 10/1999 Shang et al. .............. 712/202
6,108,768 A * 8/2000 Koppala et al. ............ 712/214
6,167,502 A 12/2000 Pechanek et al.
6,338,133 B1 * 1/2002 Schroter .................. 712/214
6,397,324 B1 * 5/2002 Barry et al. ............... 712/225
6,920,545 B2 * 7/2005 Farwell et al. ............. 712/15
2002/0026545 A1 * 2/2002 Yoshida et al. ............ 710/56
2004/0039896 A1 2/2004 Pechanek
2007/0079107 A1 * 4/2007 Van Den Berg et al. ...... 712/11

OTHER PUBLICATIONS

"Transputers: design and use as a building block" Jacco de Leeuw, Arjan de Mes, FWI University of Amsterdam, Oct. 1992.*
Shen et al. (Modern Processor Design) Beta Edition, 2003: p. 175-176 regarding reservation stations.*
Kai Hawng & Faye A. Briggs, "Computer Architecture and Parallel Processing" 1984, pp. 334-336 & pp. 487-490.

* cited by examiner

*Primary Examiner*—Eddie P Chan
*Assistant Examiner*—Keith Vicary

(57) ABSTRACT

A shared memory network for communicating between processors using store and load instructions is described. A new processor architecture which may be used with the shared memory network is also described that uses arithmetic/logic instructions that do not specify any source operand addresses or target operand addresses. The source operands and target operands for arithmetic/logic execution units are provided by independent load instruction operations and independent store instruction operations.

29 Claims, 27 Drawing Sheets

| STORE | M00 0000 | M01 0001 | M02 0011 | M03 0010 | M10 0100 | M11 0101 | M12 0111 | M13 0110 | M20 1100 | M21 1101 | M22 1111 | M23 1110 | M30 1000 | M31 1001 | M32 1011 | M33 1010 |
|---|---|---|---|---|---|---|---|---|---|---|---|---|---|---|---|---|
| P00 0000 | 1 | 1 |   | 1 | 1 | 1 |   | 1 |   |   |   |   | 1 | 1 |   | 1 |
| P01 0001 | 1 | 1 | 1 |   | 1 | 1 | 1 |   |   |   |   |   | 1 | 1 | 1 |   |
| P02 0011 |   | 1 | 1 | 1 |   | 1 | 1 | 1 |   |   |   |   |   | 1 | 1 | 1 |
| P03 0010 | 1 |   | 1 | 1 | 1 |   | 1 | 1 |   |   |   |   | 1 |   | 1 | 1 |
| P10 0100 | 1 | 1 |   | 1 | 1 | 1 |   | 1 | 1 | 1 |   | 1 |   |   |   |   |
| P11 0101 | 1 | 1 | 1 |   | 1 | 1 | 1 |   | 1 | 1 | 1 |   |   |   |   |   |
| P12 0111 |   | 1 | 1 | 1 |   | 1 | 1 | 1 |   | 1 | 1 | 1 |   |   |   |   |
| P13 0110 | 1 |   | 1 | 1 | 1 |   | 1 | 1 | 1 |   | 1 | 1 |   |   |   |   |
| P20 1100 | 1 |   | 1 |   | 1 |   | 1 |   | 1 | 1 |   | 1 | 1 | 1 |   | 1 |
| P21 1101 |   |   |   |   | 1 | 1 | 1 |   | 1 | 1 | 1 |   | 1 | 1 | 1 |   |
| P22 1111 |   |   |   |   |   | 1 | 1 | 1 |   | 1 | 1 | 1 |   | 1 | 1 | 1 |
| P23 1110 |   |   |   |   | 1 |   | 1 | 1 | 1 |   | 1 | 1 | 1 |   | 1 | 1 |
| P30 1000 | 1 | 1 |   | 1 |   |   |   |   | 1 | 1 |   | 1 | 1 | 1 |   | 1 |
| P31 1001 | 1 | 1 | 1 |   |   |   |   |   | 1 | 1 | 1 |   | 1 | 1 | 1 |   |
| P32 1011 |   | 1 | 1 | 1 |   |   |   |   |   | 1 | 1 | 1 |   | 1 | 1 | 1 |
| P33 1010 | 1 |   | 1 | 1 |   |   |   |   | 1 |   | 1 | 1 | 1 |   | 1 | 1 |

Fig. 6A

| LOAD | P00 0000 | P01 0001 | P02 0011 | P03 0010 | P10 0100 | P11 0101 | P12 0111 | P13 0110 | P20 1100 | P21 1101 | P22 1111 | P23 1110 | P30 1000 | P31 1001 | P32 1011 | P33 1010 |
|---|---|---|---|---|---|---|---|---|---|---|---|---|---|---|---|---|
| M00 0000 | 1 | 1 |  | 1 | 1 | 1 |  | 1 |  |  |  |  | 1 | 1 |  | 1 |
| M01 0001 | 1 | 1 | 1 |  | 1 | 1 | 1 |  |  |  |  |  | 1 | 1 | 1 |  |
| M02 0011 |  | 1 | 1 | 1 |  | 1 | 1 | 1 |  |  |  |  |  | 1 | 1 | 1 |
| M03 0010 | 1 |  | 1 | 1 | 1 |  | 1 | 1 |  |  |  |  | 1 |  | 1 | 1 |
| M10 0100 | 1 | 1 |  | 1 | 1 | 1 |  | 1 | 1 | 1 |  | 1 |  |  |  |  |
| M11 0101 | 1 | 1 | 1 |  | 1 | 1 | 1 |  | 1 | 1 | 1 |  |  |  |  |  |
| M12 0111 |  | 1 | 1 | 1 |  | 1 | 1 | 1 |  | 1 | 1 | 1 |  |  |  |  |
| M13 0110 | 1 |  | 1 | 1 | 1 |  | 1 | 1 | 1 |  | 1 | 1 |  |  |  |  |
| M20 1100 |  |  |  |  | 1 | 1 |  | 1 | 1 | 1 |  | 1 | 1 | 1 |  | 1 |
| M21 1101 |  |  |  |  | 1 | 1 | 1 |  | 1 | 1 | 1 |  | 1 | 1 | 1 |  |
| M22 1111 |  |  |  |  |  | 1 | 1 | 1 |  | 1 | 1 | 1 |  | 1 | 1 | 1 |
| M23 1110 |  |  |  |  | 1 |  | 1 | 1 | 1 |  | 1 | 1 | 1 |  | 1 | 1 |
| M30 1000 | 1 | 1 |  | 1 |  |  |  |  | 1 | 1 |  | 1 | 1 | 1 |  | 1 |
| M31 1001 | 1 | 1 | 1 |  |  |  |  |  | 1 | 1 | 1 |  | 1 | 1 | 1 |  |
| M32 1011 |  | 1 | 1 | 1 |  |  |  |  |  | 1 | 1 | 1 |  | 1 | 1 | 1 |
| M33 1010 | 1 |  | 1 | 1 |  |  |  |  | 1 |  | 1 | 1 | 1 |  | 1 | 1 |

Fig. 6B

| STORE*LOAD CONNECTION MATRIX | P00 0000 | P01 0001 | P02 0011 | P03 0010 | P10 0100 | P11 0101 | P12 0111 | P13 0110 | P20 1100 | P21 1101 | P22 1111 | P23 1110 | P30 1000 | P31 1001 | P32 1011 | P33 1010 |
|---|---|---|---|---|---|---|---|---|---|---|---|---|---|---|---|---|
| P00 0000 | 1 | 1 | 1 | 1 | 1 | 1 | 1 | 1 | 1 | 1 | 1 | 1 | 1 | 1 | 1 | 1 |
| P01 0001 | 1 | 1 | 1 | 1 | 1 | 1 | 1 | 1 | 1 | 1 | 1 | 1 | 1 | 1 | 1 | 1 |
| P02 0011 | 1 | 1 | 1 | 1 | 1 | 1 | 1 | 1 | 1 | 1 | 1 | 1 | 1 | 1 | 1 | 1 |
| P03 0010 | 1 | 1 | 1 | 1 | 1 | 1 | 1 | 1 | 1 | 1 | 1 | 1 | 1 | 1 | 1 | 1 |
| P10 0100 | 1 | 1 | 1 | 1 | 1 | 1 | 1 | 1 | 1 | 1 | 1 | 1 | 1 | 1 | 1 | 1 |
| P11 0101 | 1 | 1 | 1 | 1 | 1 | 1 | 1 | 1 | 1 | 1 | 1 | 1 | 1 | 1 | 1 | 1 |
| P12 0111 | 1 | 1 | 1 | 1 | 1 | 1 | 1 | 1 | 1 | 1 | 1 | 1 | 1 | 1 | 1 | 1 |
| P13 0110 | 1 | 1 | 1 | 1 | 1 | 1 | 1 | 1 | 1 | 1 | 1 | 1 | 1 | 1 | 1 | 1 |
| P20 1100 | 1 | 1 | 1 | 1 | 1 | 1 | 1 | 1 | 1 | 1 | 1 | 1 | 1 | 1 | 1 | 1 |
| P21 1101 | 1 | 1 | 1 | 1 | 1 | 1 | 1 | 1 | 1 | 1 | 1 | 1 | 1 | 1 | 1 | 1 |
| P22 1111 | 1 | 1 | 1 | 1 | 1 | 1 | 1 | 1 | 1 | 1 | 1 | 1 | 1 | 1 | 1 | 1 |
| P23 1110 | 1 | 1 | 1 | 1 | 1 | 1 | 1 | 1 | 1 | 1 | 1 | 1 | 1 | 1 | 1 | 1 |
| P30 1000 | 1 | 1 | 1 | 1 | 1 | 1 | 1 | 1 | 1 | 1 | 1 | 1 | 1 | 1 | 1 | 1 |
| P31 1001 | 1 | 1 | 1 | 1 | 1 | 1 | 1 | 1 | 1 | 1 | 1 | 1 | 1 | 1 | 1 | 1 |
| P32 1011 | 1 | 1 | 1 | 1 | 1 | 1 | 1 | 1 | 1 | 1 | 1 | 1 | 1 | 1 | 1 | 1 |
| P33 1010 | 1 | 1 | 1 | 1 | 1 | 1 | 1 | 1 | 1 | 1 | 1 | 1 | 1 | 1 | 1 | 1 |

PROCESSOR COMPOSED OF MEMORY NODES THAT EXECUTE MEMORY ACCESS INSTRUCTIONS AND COOPERATE WITH EXECUTION NODES TO EXECUTE FUNCTION INSTRUCTIONS

RELATED U.S. APPLICATION DATA

The present application claims the benefit of U.S. Provisional Application No. 60/665,668 filed Mar. 28, 2005 and U.S. Provisional Application No. 60/687,719 filed Jun. 6, 2005, both of which are incorporated by reference herein in their entirety.

FIELD OF INVENTION

The present invention relates to unique and improved methods and apparatuses for processor architecture and organizations of processors and memory modules such that communication between the modules is efficient. More specifically, this invention concerns multiprocessor systems having a shared memory interconnection network for communication among the processors and memory modules and an architecture used by the processors that efficiently supports such communication.

BACKGROUND OF INVENTION

One of the problems associated with increasing performance in multiprocessor parallel processing systems is the efficient accessing of data or instructions from memory. Having adequate memory bandwidth for sharing of data between processors is another problem associated with parallel processing systems. These problems are related to the organization of the processors and memory modules and the processor architecture used for communication between a processor and memory and between processors. Various approaches to solving these problems have been attempted in the past, for example, array processors and shared memory processors.

Multiprocessor systems can be classified generally in terms of coupling strength for communication between processors. Those multiprocessor systems that communicate using a share memory facility between the processors and the shared memory over an interconnection network are generally considered tightly coupled. Loosely coupled multiprocessor systems generally use an input/output (I/O) communication mechanism in each processor, such as message passing, for communicating between the processors over an interconnection network. A wide variety of interconnection networks have been utilized in multiprocessing systems. For example, rings, bus connected, crossbar, tree, shuffle, omega, and butterfly, mesh, hypercube, and ManArray networks, have been used in prior multiprocessor systems. From an application or use perspective, specific networks have been chosen primarily based upon performance characteristics and cost to implement tradeoffs.

A network for an application of a multiprocessor system is evaluated based on a number of characteristics. Parameters considered include, for example, a network size of N nodes, where each node has L connection links including input and output paths, a diameter D for the maximum shortest path between any two pair of nodes, and an indication of da cost C in terms of the number of connection paths in the network. A ring network, for example, provides connections between adjacent processors in a linear organization with L=2, D=N/2, and C=N. In another example, a crossbar switch network provides complete connectivity among the nodes with L=N, D=1, and C=$N^2$. Table 1 illustrates these characteristics for a number of networks where N is a power of 2.

| Network of N nodes N a power of 2 | Links (L) | Diameter (D) | Cost (C) |
|---|---|---|---|
| Ring | 2 | N/2 | N |
| B × B Torus for N = $2^K$ For K even & B = $2^{K/2}$ | 4 | B = $2^{K/2}$ | 2N |
| XD Hypercube for X = $Log_2 N$ | $Log_2 N$ | $Log_2 N$ | (X/2)N |
| XD ManArray hypercube for X = 2k and X even | 4 | 2 | $2^{2k-1}((4 + 3^{k-1}) - 1)$ |
| Crossbar | N | 1 | $N^2$ |

FIG. 1A illustrates a prior art 4×4 torus network 100 having sixteen processor (P) elements (PEs). Each PE supports four links in the regular nearest neighborhood connection pattern shown. The diameter is four, which is the maximum shortest path between any two nodes, such as, for example, P00 104 and P22 108. The cost is thirty-two representing the thirty-two connections used to interconnect the PEs.

FIG. 1B illustrates a connectivity matrix 150 for the 4×4 torus network 100 of FIG. 1A. Each of the sixteen PEs represents a column and a row of the matrix. A "1" in a cell of the connectivity matrix 150 indicates that the row PE connects to the column PE. For example, four "1"s populate P21 row 154, indicating that P21 connects to P11, P20, P22, and P31. The connectivity matrix 150 is populated only with the nearest neighbor connections.

FIG. 2 illustrates a prior art 4×4 ManArray network 200, as illustrated in U.S. Pat. No. 6,167,502. The 4×4 ManArray network 200 has sixteen processors such as processor 1,3 (0110) 204. Each processor is connected to a local cluster switch, such as local cluster switch 208 associated with a 2×2 processor cluster, such as, 2×2 processor cluster 212. In the cluster switch are a number of multiplexers which are connected to the processors to provide the interconnecting network for the sixteen processors. For example, each of the four processors in the 2×2 processor cluster 212 connect to four multiplexers in the associated local cluster switch 208. The 4×4 ManArray network 200 has an indication of the cost C of 88 and a diameter of 2.

FIG. 3 illustrates a prior art shared memory processor 300 having processor nodes P0-Pp-1 304, memory nodes M0-Mm-1 306, input/output (I/O) nodes I/O0-I/Od-1 308 interconnected by a cross bar switch 310. The cross bar switch provides general data accessing between the processors, memory, and I/O. The processors typically interface to memory over a memory hierarchy which typically locates instruction and data caches local to the processors. The memories M0-Mm-1 typically represent higher levels of the memory hierarchy above the local caches.

The prior techniques of interconnecting memory and processors have to contend with multiple levels of communication mechanisms and complex organizations of control and networks.

SUMMARY OF THE INVENTION

It is appreciated that improvements to processor architecture, network design, and organizations of processors and memory are desired. Such improvements are provided by multiple embodiments of the present invention. In one embodiment of the present invention a network of nodes identified according to a G×H matrix with g∈{0,1, . . . ,G−1} and h∈{0,1, . . . ,H−1} is provided. The network of nodes has a first set of nodes $\{A_{0,0}, A_{0,1}, \ldots, A_{0,H-1}, A_{1,0}, A_{1,1}, \ldots, A_{1,H-1}, \ldots, A_{G-1,H-1}\}$ where each node $A_{g,h}$ has an output. A second set of nodes $\{R_{0,0}, R_{0,1}, \ldots, R_{0,H-1}, R_{1,0}, R_{1,1}, \ldots, R_{1,H-1}, \ldots, R_{G-1,H-1}\}$ where each node $R_{g,h}$ has an output and each node $R_{g,h}$ has a first input connected to the output of node $A_{g,h}$, a second input connected to the output of node $A_{g,h+1}$, and a third input connected to the output of node $A_{g,h-1}$, where h+1 wraps to 0 when h+1=H and h−1 wraps to H−1 when h−1=−1. The network of nodes also has a third set of nodes $\{S_{0,0}, S_{0,1}, \ldots, S_{0,H-1}, S_{1,0}, S_{1,1}, \ldots, S_{1,H-1}, \ldots, S_{G-1,H-1}\}$ where each node $S_{g,h}$ has an output and each node $S_{g,h}$ has a first input connected to the output of node $R_{g,h}$, a second input connected to the output of node $R_{g+1,h}$, and a third input connected to the output of node $R_{g-1,h}$, where g+1 wraps to 0 when g+1=G and g−1 wraps to G−1 when g−1=−1.

Another embodiment of the present invention provides a method of constructing a network of nodes $N(i)_{g,h}$ identified by $g \in \{0, 1, \ldots, G-1\}$, $h \in \{0, 1, \ldots, H-1\}$, where N(0) identifies nodes in a first set of nodes, N(1) identifies nodes in a second set of nodes, and N(2) identifies nodes in a third set of nodes. The method provides steps for connecting for i=0 an output of each node $N(i)_{g,h}$ to an input of node $N(i+1)_{g,h}$ and to an input of node $N(i+1)_{g}$,h+1 and to an input of node $N(i+1)_{g,h-1}$ where h+1 wraps to 0 when h+1=H and h−1 wraps to H−1 when h−1=−1. A step for connecting for i=1 an output of each node $N(i)_{g,h}$ to an input of node $N(i+1)_{g,h}$ and to an input of node $N(i+1)_{g+1,h}$ and to an input of node $N(i+1)_{g-1,h}$ where g+1 wraps to 0 when g+1=G and g−1 wraps to G−1 when g−1=−1.

A further embodiment of the present invention has a processor node operative to execute arithmetic instructions. The processor has an arithmetic instruction decoder that decodes arithmetic instructions responsive to arithmetic instructions having a format containing only execution unit operation information without use of source operand or target operand fields. The processor also has an execute unit that executes the decoded arithmetic instruction with source operands provided as an input to the arithmetic execution unit, the source operands specified by a load instruction independent of the arithmetic instruction and the execution unit generates results of the arithmetic execution that are provided as an output of the arithmetic execution unit, the storage of the results specified by a store instruction independent of the arithmetic instruction.

These and other features, aspects, techniques and advantages of the invention will be apparent to those skilled in the art from the following detailed description, taken together with the accompanying drawings and claims.

BRIEF DESCRIPTION OF THE DRAWINGS

FIG. 6A illustrates a connectivity matrix for store operations for the WAM16S network of FIG. 4A in accordance with the present invention;

FIG. 6B illustrates a connectivity matrix for load operations for the WAM16L network of FIG. 5A in accordance with the present invention;

FIG. 6C illustrates a connectivity matrix for communicating between processors by combining store WAM16S and load WAM16L operations in accordance with the present invention;

DETAILED DESCRIPTION

Figure 1A:
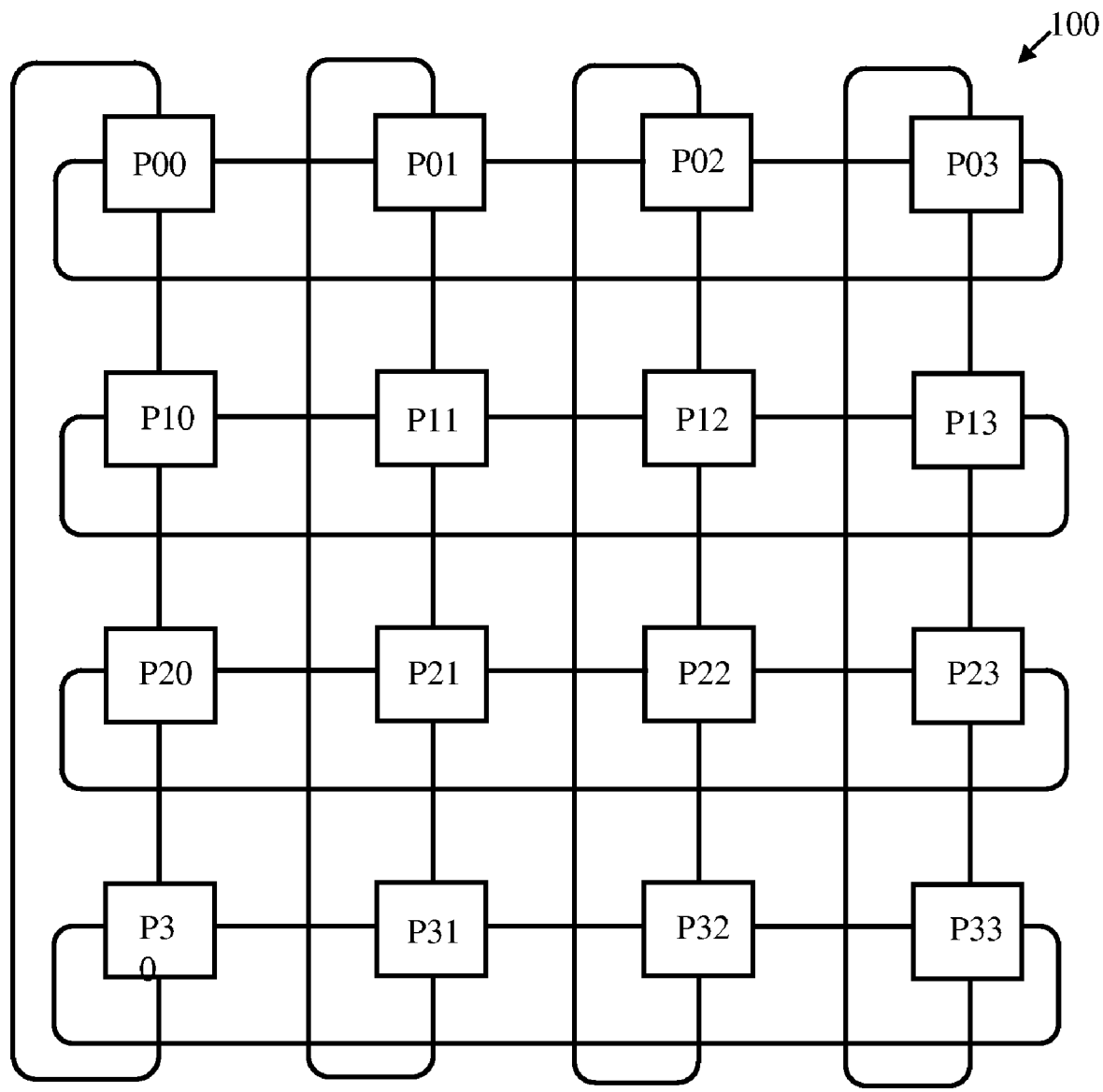
FIG. 1A illustrates a prior art 4×4 torus network having sixteen processing elements (PEs)
Figure 1B:
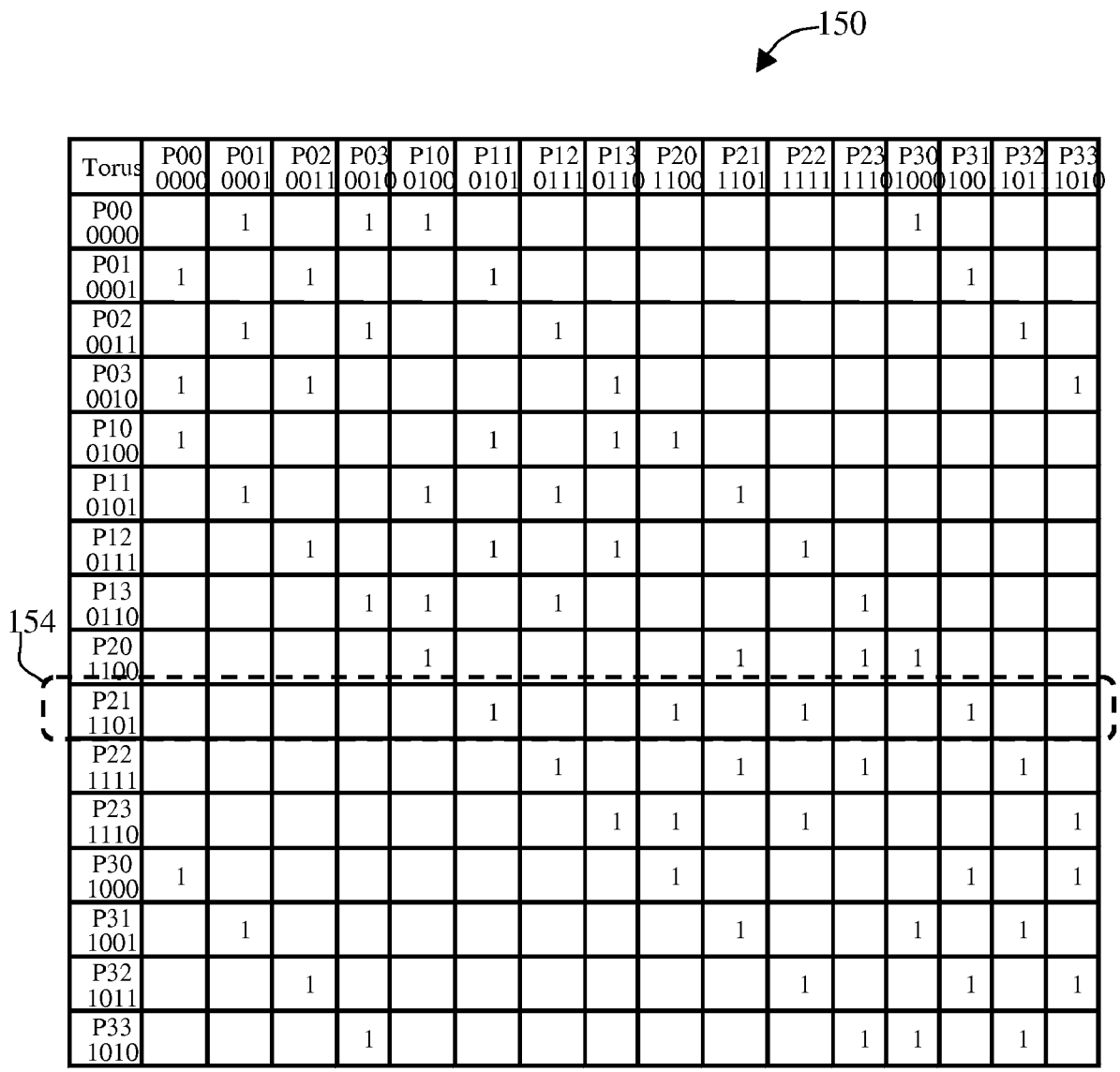
FIG. 1B illustrates a connectivity matrix for the 4×4 torus network of FIG. 1A.
Figure 2:
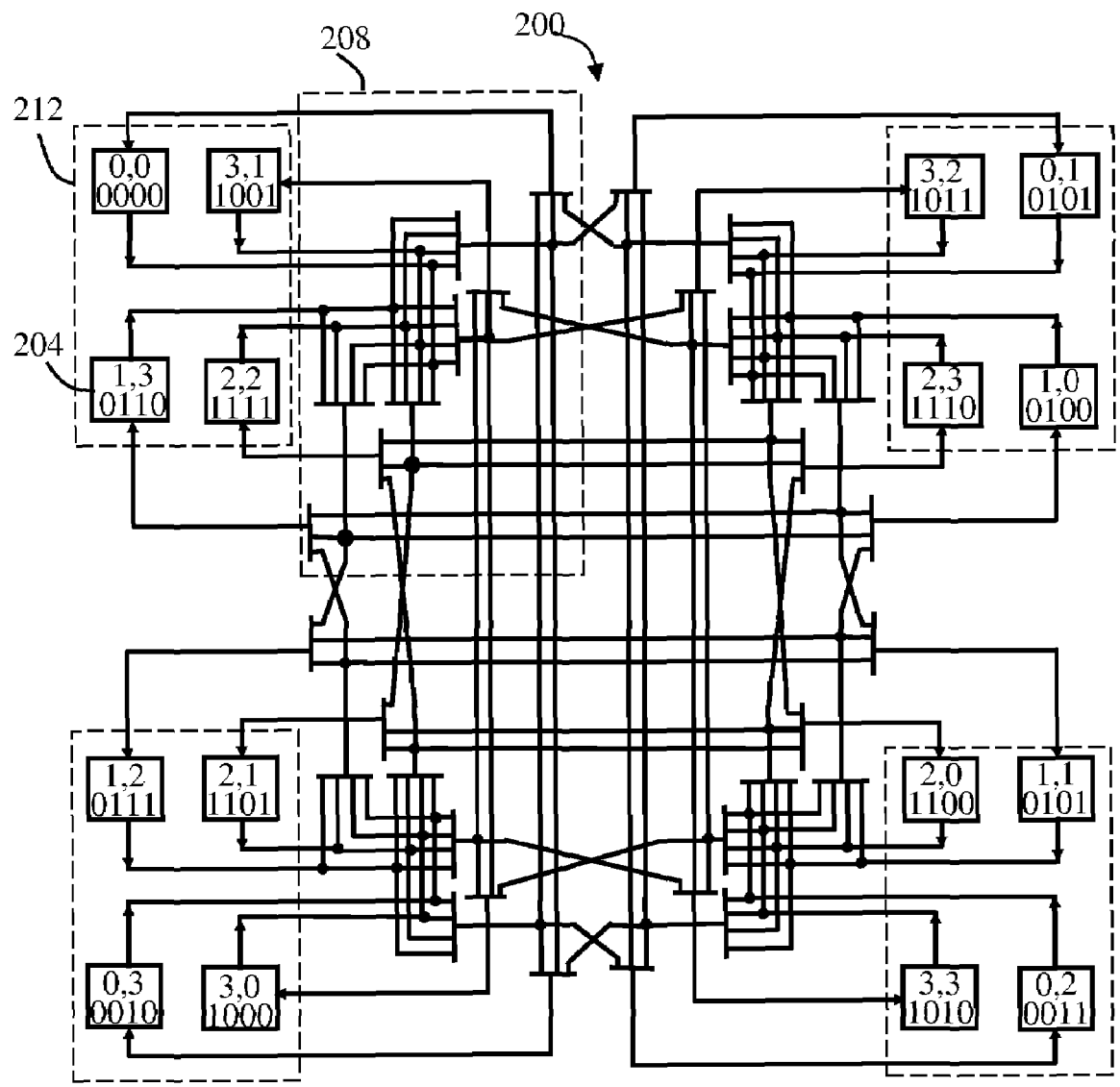
FIG. 2 illustrates a prior art 4×4 ManArray network from U.S. Pat. No. 6,167,502.
Figure 3:
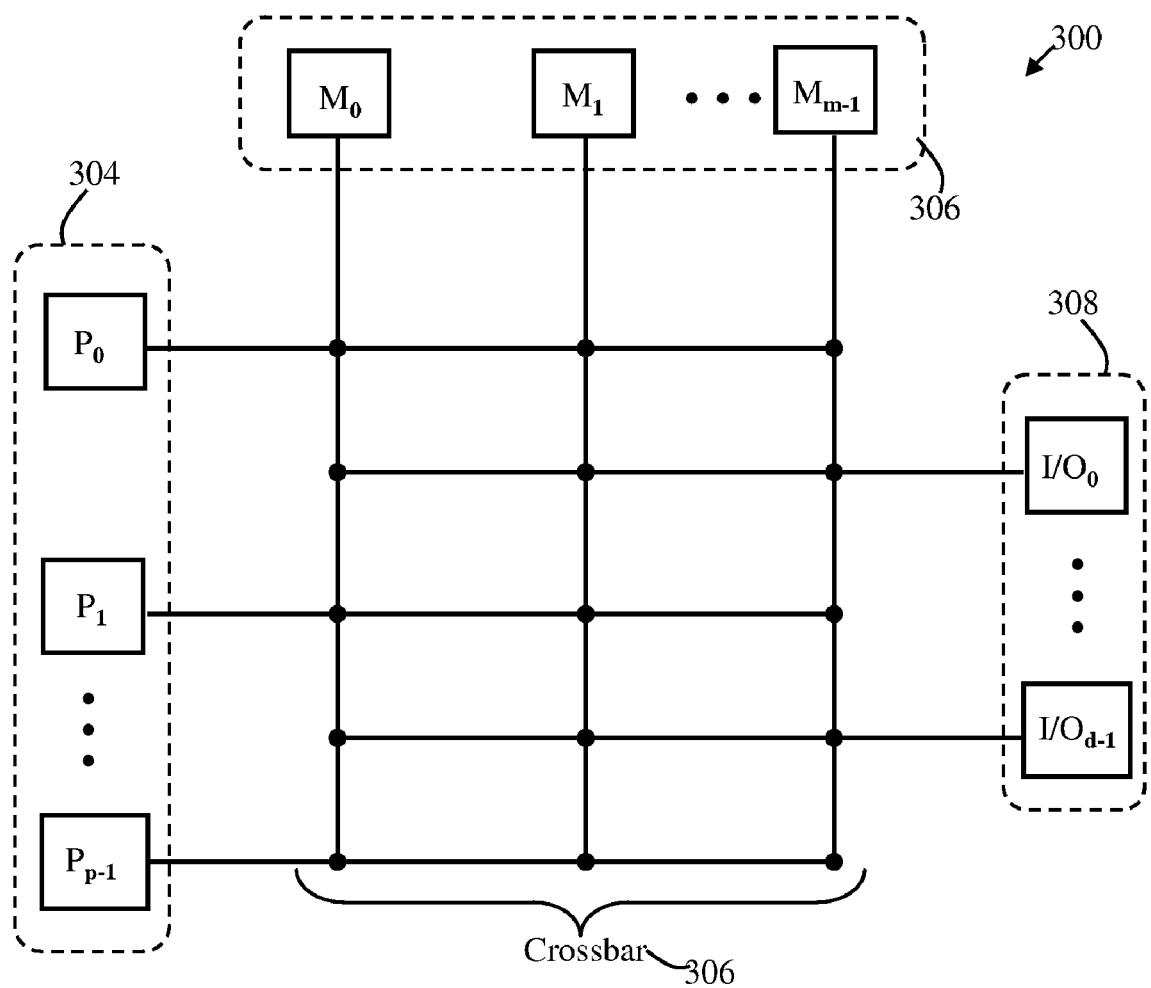
FIG. 3 illustrates a prior art shared memory processor.
Figure 4A:
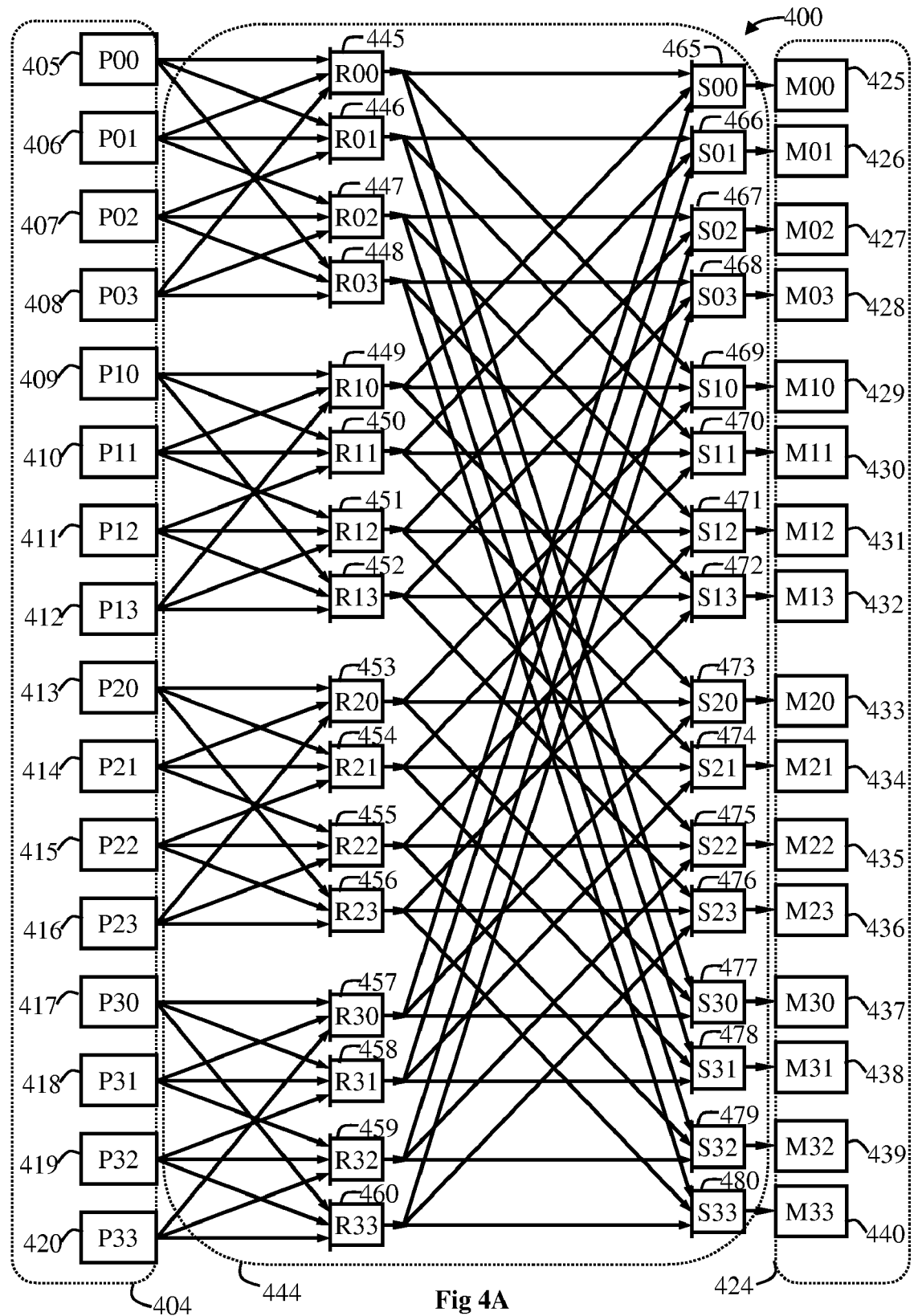
FIG. 4A illustrates a Wings array memory (WAM) sixteen processor (16) network for store (S) operations in accordance with the present invention.

FIG. 4A illustrates a Wings array memory (WAM) sixteen processor (16) (WAM16S) network 400 for store (S) operations. A processor array 404 of sixteen processors 405-420 are illustrated as nodes that each can initiate a store operation to store data in a memory location in the Wings array memory (WAM) 424 consisting of sixteen memory blocks 425-440. The processor and memory block nodes are organized in linear arrays and identified according to a G×H matrix where, in this example, G equals four representing the number of rows in the matrix and H equals four representing the number of columns. A processor $P_{g,h}$, a memory block $M_{g,h}$, and internal nodes of the network are labeled in a row g by column h format where g∈{0,1,...,G−1} and h∈{0,1,...,H−1}. The processors are not directly connected to each other nor are the memory blocks directly connected to any of the other memory blocks.

A two stage WAM network 444 interconnects the processors 405-420 and memory blocks 425-440 for store operations. A first stage of nodes are multiplexers 445-460 which are labeled in a row g by column h $R_{g,h}$ matrix. A second stage of nodes are multiplexers 465-480 which are labeled in a row g by column h $S_{g,h}$ matrix. The processors $P_{g,h}$ each have an output, memory blocks $M_{g,h}$ each have an input, and multiplexers $R_{g,h}$ and $S_{g,h}$ each have three inputs and an output. The processors $P_{g,h}$, the memory bocks $M_{g,h}$, the multiplexers $R_{g,h}$, and the multiplexers $S_{g,h}$ are labeled in the figures as Pgh, Mgh, Rgh, and Sgh, respectively, for ease of notation and reference in the figures. The first stage of multiplexers 445-460 are partitioned into groups by rows of the G=4×H=4 matrix. For example, in the first row g=0 of the processor matrix, the outputs of the processors 405-408 are connected to the inputs of the multiplexers 445-448. For the next row, g=1, the outputs of the processors 409-412 are connected to the inputs of the multiplexers 449-452. The next row, g=2, the outputs of the processors 413-416 are connected to the inputs of the multiplexers 453-456. The last row, g=3, processors 417-420 are connected to multiplexers 457-460.

In each group, the connections are made according to an adjacency of nodes in a first dimension, for example, P00 405 is connected to R00 445, R01 446, and R03 448. P01 406 is connected to R00 445, R01 446, and R02 447. P02 407 is connected to R01 446, R02 447, and R03 448. P03 408 is connected to R00 445, R02 447, and R03 448. Each processor in the second row group P10-P13 409-412, third row group P20-P23 413-416, and fourth row group P30-P33 417-420, are connected in a similar fashion according to their row adjacency to second row multiplexers R10-R13 449-452, third row multiplexers R20-R23 453-456, and fourth row multiplexers R30-R33 457-460, respectively.

The first stage multiplexers 445-460 are connected to the second stage multiplexers 465-480 according to an adjacency of nodes in a second dimension, for example, the output of the multiplexer node R00 445 is connected to the inputs of the multiplexer nodes S00 465, S10 469, and S30 477. In a similar fashion, R01 446 is connected to S01 466, S11 470, and S31 478. R02 447 is connected to S02 467, S12 471, and S32 479. R03 448 is connected to S03 468, S13 472, and S33 480. The multiplexers in the second row group R10-R13 449-452 are connected to the second stage multiplexers according to their column adjacency, such that, R10 449 is connected to S00 465, S10 469, and S20 473, R11 450 is connected to S01 466, S11 470, and S21 474, R12 451 is connected to S02 467, S12 471, and S22 475, and R13 452 is connected to S03 468, S13 472, and S23 476. The third row group R20-R23 453-456 and the fourth row group R30-R33 457-460 are connected in a similar fashion according to their column adjacency associated second stage multiplexers from the multiplexers 465-480.

Each output of the second stage multiplexers connects to the input of their associated memory block at the same row column position. For example, the output of the multiplexer S00 465 connects to the input of the memory block M00 425, the output of the multiplexer S01 466 connects to the input of the memory block M01 426, and so forth. A processor executing a store operation can write data to a single memory block or combinations of up to nine memory blocks from the memory array 424. For example, processor P21 can store data to memories in its connected group of memory blocks M10 429, M20 433, M30 437, M11 430, M21 434, M31 438, M12 431, M22 435, and M32 439.

The adjacency of nodes is represented by a G×H matrix where the nodes of the matrix, may be processors, memory blocks, multiplexers, or the like, generally, having nodes $N_{g,h}$ where g∈{0,1,...,G−1} and h∈{0,1,...,H−1}. A connection network, such as, the WAM16S network 400 of FIG. 4A, may be generalized as having a first set of nodes, such as processor nodes $P_{g,h}$, for example, connects to a second set of nodes $R_{g,h}$ which connects to a third set of nodes $S_{g,h}$. The third set of nodes $S_{g,h}$ then connects to a fourth set of nodes, such as memory block nodes $M_{g,h}$, for example. The store connectivity of the nodes can be viewed as having nodes $R_{g,h}$ connect as follows:

| Inputs of Node | Connects to the outputs of the Nodes | Where |
|---|---|---|
| $R_{g,h}$ | $P_{g,h}$, $P_{g,h+1}$, and $P_{g,h-1}$ | h + 1 wraps to 0 when h + 1 = H and h − 1 wraps to H − 1 when h − 1 = −1 |

The nodes $S_{g,h}$ connect as follows:

| Inputs of Node | Connects to the outputs of the Nodes | Where |
|---|---|---|
| $S_{g,h}$ | $R_{g,h}$, $R_{g+1,h}$, and $R_{g-1,h}$ | g + 1 wraps to 0 when g + 1 = G and g − 1 wraps to G − 1 when g − 1 = −1 |

The nodes $M_{g,h}$ connect as follows:

| Input of Node | Connects to the output of the Node |
|---|---|
| $M_{g,h}$ | $S_{g,h}$ |

For the example WAM16S network 400 of FIG. 4A, the nodes $R_{g,h}$ connect as follows:

| Inputs of Node | Connects to the outputs of the Nodes | Where |
|---|---|---|
| $R_{g,h}$ | $P_{g,h}$, $P_{g,h+1}$, and $P_{g,h-1}$ | h + 1 wraps to 0 when h + 1 = 4 and h − 1 wraps to 4 − 1 = 3 when h − 1 = −1 |

The nodes $S_{g,h}$ connect as follows:

| Inputs of Node | Connects to the outputs of the Nodes | Where |
|---|---|---|
| $S_{g,h}$ | $R_{g,h}$, $R_{g+1,h}$, and $R_{g-1,h}$ | g + 1 wraps to 0 when g + 1 = 4 and g − 1 wraps to 4 − 1 = 3 when g − 1 = −1 |

The nodes $M_{g,h}$ connect as follows:

| Input of Node | Connects to the output of the Node |
|---|---|
| $M_{g,h}$ | $S_{g,h}$ |

The store connectivity of the nodes can also be viewed as having nodes $P_{g,h}$ connect as follows:

| Output of Node | Connects to an input of the Nodes | Where |
|---|---|---|
| $P_{g,h}$ | $R_{g,h}$, $R_{g,h+1}$, and $R_{g,h-1}$ | h + 1 wraps to 0 when h + 1 = H and h − 1 wraps to H − 1 when h − 1 = −1 |

The nodes $R_{g,h}$ connect as follows:

| Output of Node | Connects to an input of the Nodes | Where |
|---|---|---|
| $R_{g,h}$ | $S_{g,h}$, $S_{g+1,h}$, and $S_{g-1,h}$ | g + 1 wraps to 0 when g + 1 = G and g − 1 wraps to G − 1 when g − 1 = −1 |

The nodes $S_{g,h}$ connect as follows:

| Output of Node | Connects to the input of the Node |
|---|---|
| $S_{g,h}$ | $M_{g,h}$ |

Figure 4B:
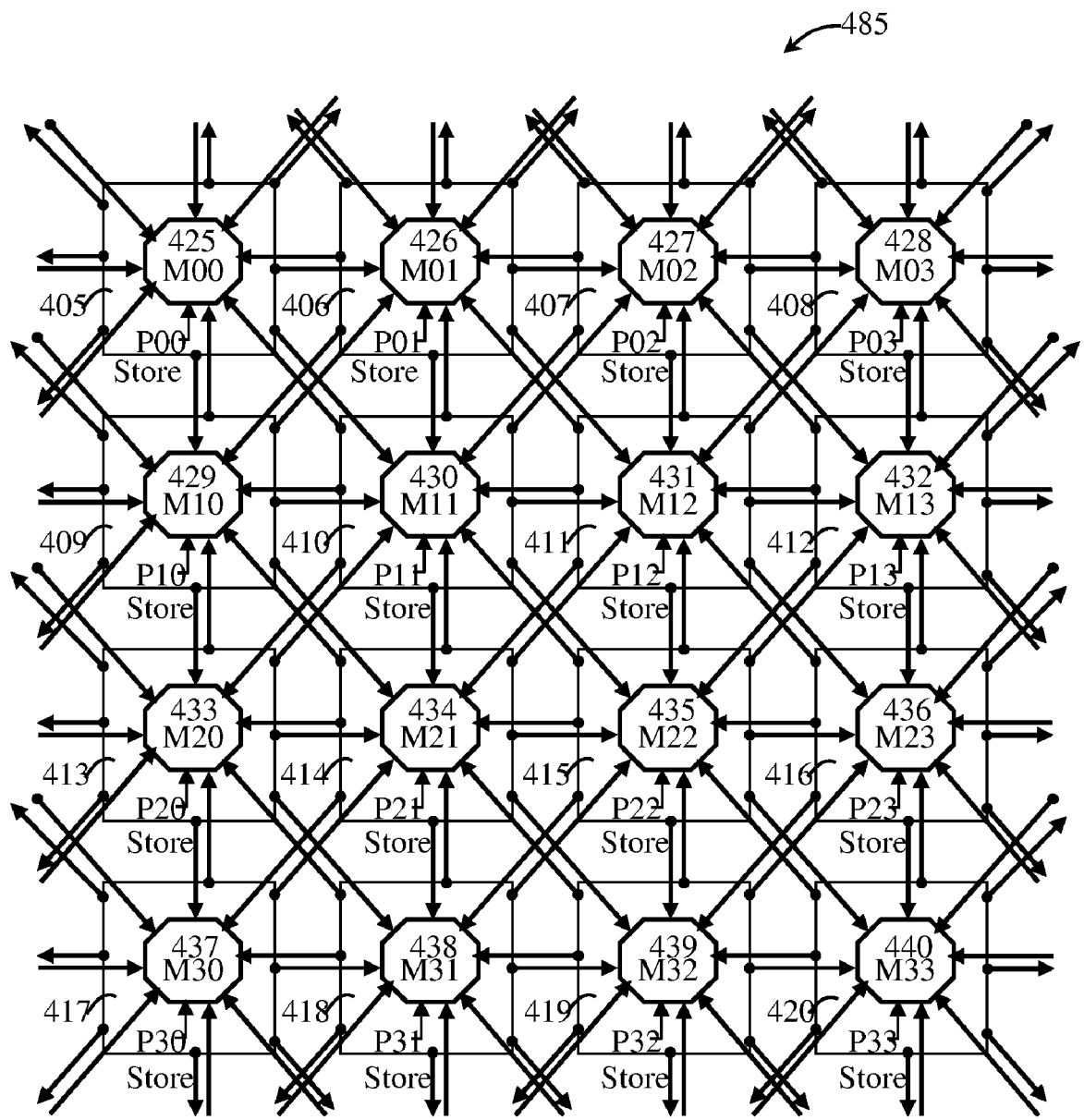
FIG. 4B illustrates the effective store connectivity of the WAM16S network of FIG. 4A in accordance with the present invention.

This store connectivity is more clearly shown in FIG. 4B which illustrates the effective store connectivity 485 of the WAM16S network 400 of FIG. 4A. FIG. 4B is an overhead view of the memory array 424 of FIG. 4A (octagonal blocks) overlaid upon the processor array 404 of FIG. 4A (square blocks). The effective store paths between processors and memories are obtained through the use of the two stage WAM network 444 of FIG. 4A. Such effective store paths are shown as arrow lines connecting a processor to a memory block. A store path between processor $P_{g,h}$ and memory $M_{g,h}$, such as between P21 414 and M21 434, is shown as a short arrow line beginning from the processor label $P_{g,h}$ and pointing to the memory $M_{g,h}$ block. Each memory block can be reached for storing data from a neighborhood of nine processors.

Figure 5A:
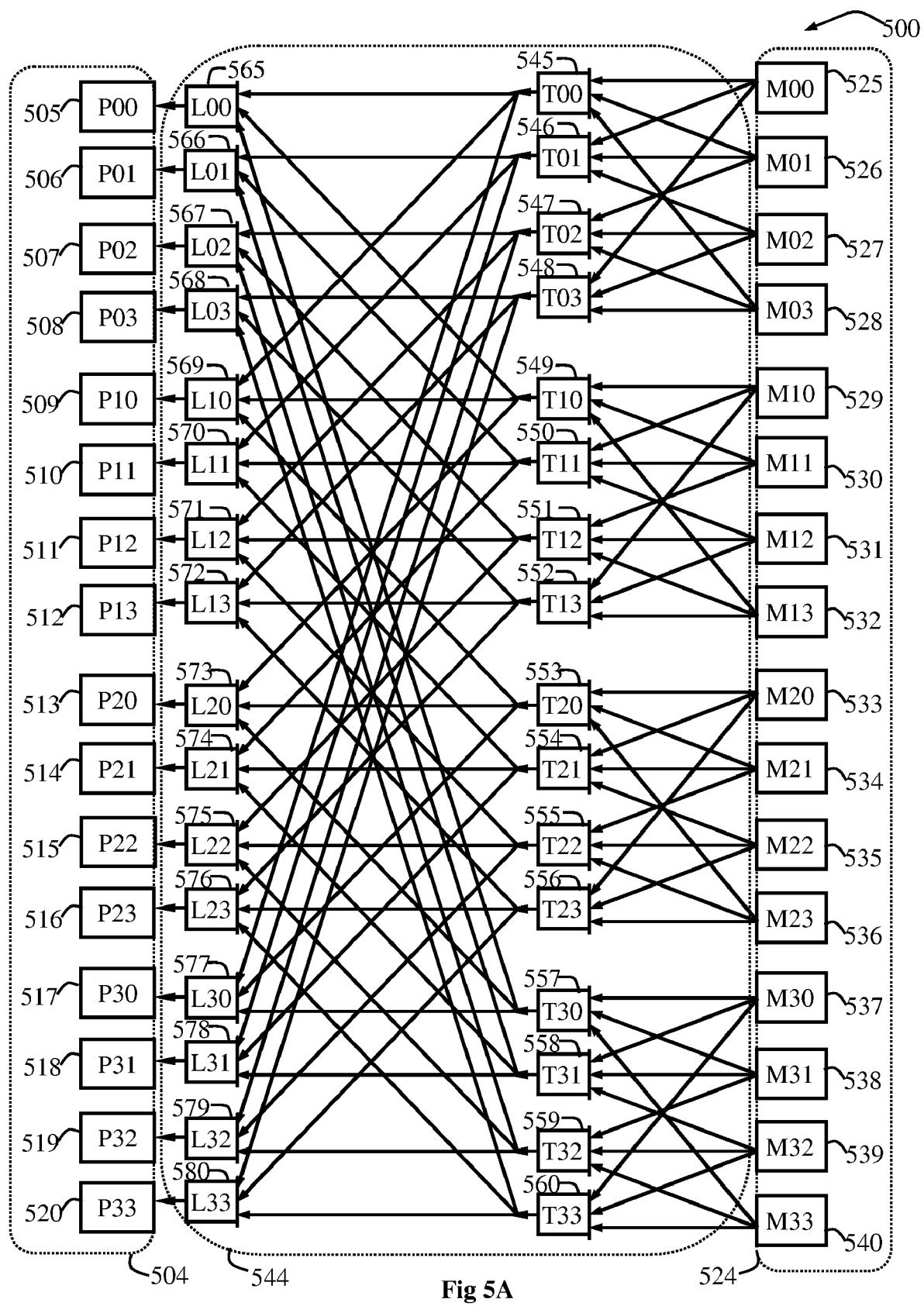
FIG. 5A illustrates a WAM16 load (L) network for load operations in accordance with the present invention.

FIG. 5A illustrates a Wings array memory (WAM) sixteen processor (16) (WAM16L) network 500 for load (L) operations. A processor array 504 of sixteen processors 505-520 are illustrated as nodes that each can initiate a load operation to fetch data from a memory location in the Wings array memory (WAM) 524 consisting of sixteen memory blocks 525-540. The processor and memory block nodes are organized in a linear array and identified according to a G×H matrix where G equals four representing the number of rows in the matrix and H equals four representing the number of columns. A processor $P_{g,h}$ and a memory block $M_{g,h}$ are labeled in a row g by column h format where g∈{0,1,...,G−1} and h∈{0,1,...,H−1}. The processors are not directly connected to each other nor are the memory blocks directly connected to any of the other memory blocks.

A two stage WAM network 544 interconnects the processors 505-520 and memory blocks 525-540 for load operations. A first stage of nodes are multiplexers 545-560 which are labeled in a row column $T_{g,h}$ matrix. A second stage of nodes are multiplexers 565-580 which are labeled in a row column $L_{g,h}$ matrix. The processors $P_{g,h}$ each have an input, memory blocks $M_{g,h}$ each have an output, and multiplexers $T_{g,h}$ and $L_{g,h}$ each have three inputs and an output. The processors $P_{g,h}$, the memory bocks $M_{g,h}$, the multiplexers $T_{g,h}$, and the multiplexers $L_{g,h}$ are labeled in the figures as Pgh, Mgh, Tgh, and Lgh, respectively, for ease of notation and reference in the figures. The first stage of multiplexers 545-560 are partitioned into groups by rows of the G=4×H=4 matrix. For example, in the first row g=0 of the memory matrix, memories 525-528 are connected to multiplexers 545-548. For the next row, g=1, memories 529-532 are connected to multiplexers 549-552. The next row, g=2, memories 533-536 are connected to multiplexers 553-556. The last row, g=3, memories 537-540 are connected to multiplexers 557-560.

In each group, the connections are made according to an adjacency of nodes in a first dimension, for example, M00 525 is connected to T00 545, T01 546, and T03 548. M01 526 is connected to T00 545, T01 546, and T02 547. M02 527 is connected to T01 546, T02 547, and T03 548. M03 528 is connected to T00 545, T02 547, and T03 548. Each memory block in the second row group M10-M13 529-532, third row group M20-M23 533-536, and fourth row group M30-M33 537-540, are connected in a similar fashion according to their row adjacency to second row multiplexers T10-T13 549-552, third row multiplexers T20-T23 553-556, and fourth row multiplexers T30-T33 557-560, respectively.

The first stage multiplexers 545-560 are connected to the second stage multiplexers 565-580 according to an adjacency of nodes in a second dimension, for example, T00 545 is connected to L00 565, L10 569, and L30 577. T01 546 is connected to L01 566, L11 570, and L31 578. T02 547 is connected to L02 567, L12 571, and L32 579. T03 548 is connected to L03 568, L13 572, and L33 580. The multiplexers in the second row group T10-T13 549-552 are connected to the second stage multiplexers according to their column adjacency, such that, T10 549 is connected to L00 565, L10 569, and L20 573, T11 550 is connected to L01 566, L11 570, and L21 574, T12 551 is connected to L02 567, L12 571, and L22 575, and T13 552 is connected to L03 568, L13 572, and L23 576. The third row group T20-T23 553-556 and the fourth row group T30-T33 557-560 are connected in a similar fashion according to their column adjacency associated second stage multiplexers.

Each output of the second stage multiplexers connects to the load input of their associated processors at the same row column position. For example, the output of the multiplexer L00 565 connects to the input of processor P00 505, the output of the multiplexer L01 566 connects to the input of processor P01 506, and so forth. A processor executing a load operation can select a memory block from a group of nine memory blocks to fetch data from the selected memory block. For example, processor P21 514 can load data from memories in its connected group of memory blocks M10 529, M20 533, M30 537, M11 530, M21 534, M31 538, M12 531, M22 535, and M32 539. Load addresses may follow connection paths in a network configuration such as the WAM16S network 400 of FIG. 4A, for example to provide memory addresses to selected memories as part of a load operation. Alternative methods to handle address paths is discussed in more detail below.

The adjacency of nodes is represented by a GxH matrix where the nodes of the matrix, may be processors, memory blocks, multiplexers, or the like, generally, having nodes $N_{g,h}$ where $g \in \{0,1,\ldots,G-1\}$ and $h \in \{0,1,\ldots,H-1\}$. A connection network, such as, the WAM16L network 500 of FIG. 5A, may be generalized as having a first set of nodes, such as memory nodes $M_{g,h}$, for example, connects to a second set of nodes $T_{g,h}$ which connects to a third set of nodes $L_{g,h}$. The third set of nodes $L_{g,h}$ then connects to a fourth set of nodes, such as processor nodes $P_{g,h}$, for example. The load connectivity of the nodes can be viewed as having nodes $T_{g,h}$ connect as follows:

| Inputs of Node | Connects to the outputs of the Nodes | Where |
|---|---|---|
| $T_{g,h}$ | $M_{g,h}$, $M_{g,h+1}$, and $M_{g,h-1}$ | h + 1 wraps to 0 when h + 1 = H and h − 1 wraps to H − 1 when h − 1 = −1 |

The nodes $L_{g,h}$ connect as follows:

| Inputs of Node | Connects to the outputs of the Nodes | Where |
|---|---|---|
| $L_{g,h}$ | $T_{g,h}$, $T_{g+1,h}$, and $T_{g-1,h}$ | g + 1 wraps to 0 when g + 1 = G and g − 1 wraps to G − 1 when g − 1 = −1 |

The nodes $P_{g,h}$ connect as follows:

| Input of Node | Connects to the output of the Node |
|---|---|
| $P_{g,h}$ | $L_{g,h}$ |

For the example WAM16L network 500 of FIG. 5A, the nodes $T_{g,h}$ connect as follows:

| Inputs of Node | Connects to the outputs of the Nodes | Where |
|---|---|---|
| $T_{g,h}$ | $M_{g,h}$, $M_{g,h+1}$, and $M_{g,h-1}$ | h + 1 wraps to 0 when h + 1 = 4 and h − 1 wraps to 4 − 1 = 3 when h − 1 = −1 |

The nodes $L_{g,h}$ connect as follows:

| Inputs of Node | Connects to the outputs of the Nodes | Where |
|---|---|---|
| $L_{g,h}$ | $T_{g,h}$, $T_{g+1,h}$, and $T_{g-1,h}$ | g + 1 wraps to 0 when g + 1 = 4 and g − 1 wraps to 4 − 1 = 3 when g − 1 = −1 |

The nodes $P_{g,h}$ connect as follows:

| Input of Node | Connects to the output of the Node |
|---|---|
| $P_{g,h}$ | $L_{g,h}$ |

Figure 5B:
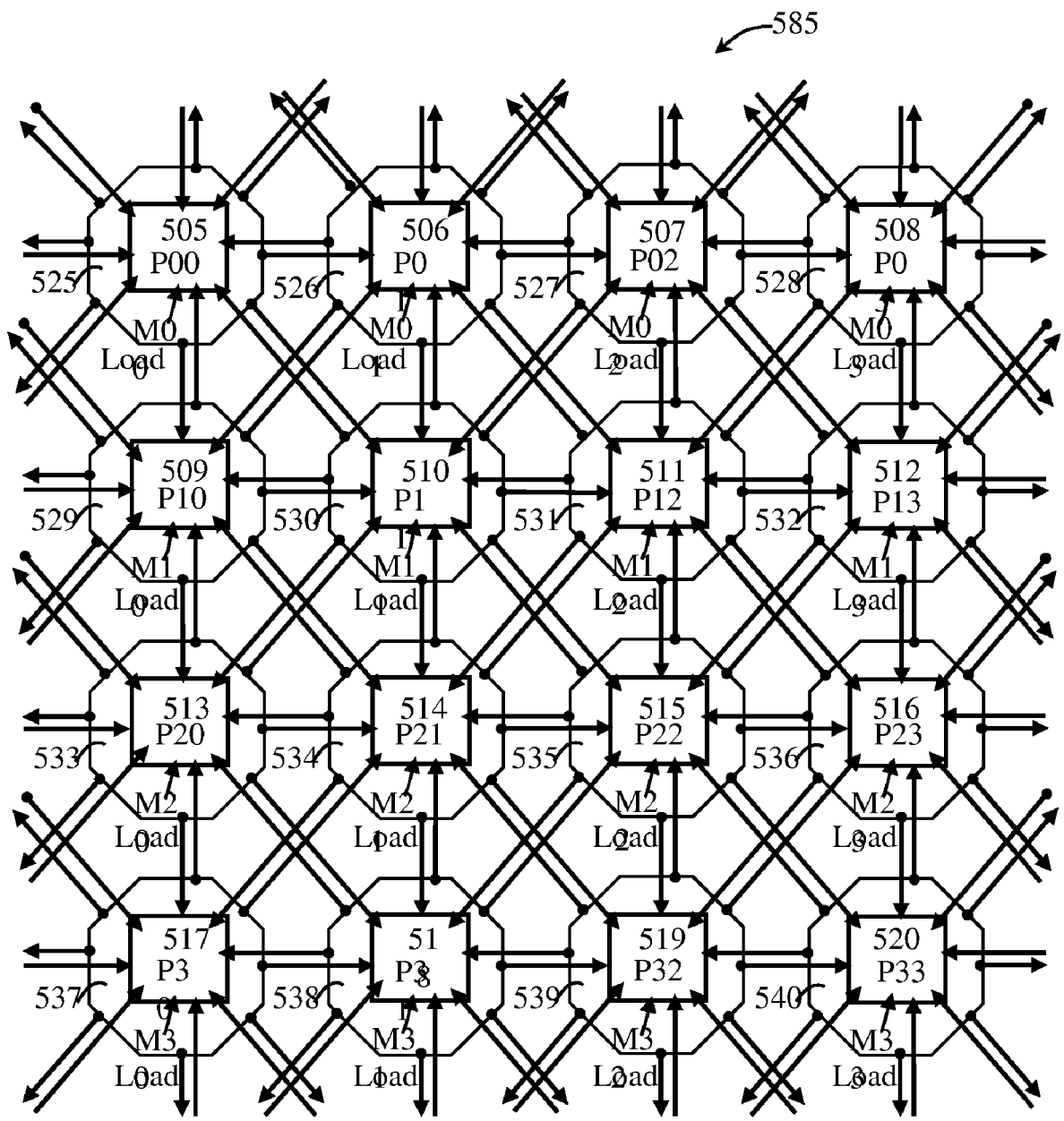
FIG. 5B illustrates the effective load connectivity of the WAM16L network of FIG. 5A in accordance with the present invention.

This load connectivity is more clearly shown in FIG. 5B which illustrates the effective load connectivity 585 of the WAM16S network 500 of FIG. 5A. FIG. 5B is an overhead view of the processor array 504 of FIG. 5A (square blocks) overlaid upon the memory array 524 of FIG. 5A (octagonal blocks). The effective load paths between memories and processors are obtained through the use of the two stage WAM network 544 of FIG. 5A. Such effective load paths are shown as arrow lines connecting a memory block to a processor. A load path between memory $M_{g,h}$ and processor $P_{g,h}$, such as between M21 534 and P21 514, is shown as a short arrow line beginning from the memory $M_{g,h}$ block and pointing to the processor $P_{g,h}$. Each processor can be reached by loading data from a neighborhood of nine memory blocks.

FIG. 6A illustrates a store connectivity matrix 600 for store operations for the WAM16S network 400 of FIG. 4A. The processors are organized in the same linear order as the processor array 404 shown in the WAM16S network 400. The memories are organized in the same linear order as the Wings array memory (WAM) 424 shown in the WAM16S network 400. In addition to the processor and memory labels used in the WAM16S network 400, the processors and memories have a Gray encoded label underneath the $P_{g,h}$ and $M_{g,h}$ labels. A 1 in a cell of the store connectivity matrix 600 indicates that a processor on the same row as the cell has a store connection to a memory block on the same column as the cell. For example, the connectivity of the processors in processor group 602 having processors P10, P11, P12, and P13 connecting to memory blocks in the three memory block groups 604, 606, and 608 is indicated by "1s" as connection points in circled connection sub-matrices 610, 612, and 614.

FIG. 6B illustrates a load connectivity matrix 630 for load operations for the WAM16L network 500 of FIG. 5A. The processors are organized in the same order as the processor array 504 in the WAM16L network 500. The memories are organized in the same linear order as the Wings array memory (WAM) 524 shown in the WAM16L network 500. In addition to the processor and memory labels used in the WAM16L network 500, the processors and memories have a Gray encoded label underneath the $P_{g,h}$ and $M_{g,h}$ labels. A 1 in a cell indicates that a memory block on the same row as the cell has a load connection to a processor on the same column as the cell.

FIG. 6C illustrates a connectivity matrix 670 for communicating between processors by combining store operations on the WAM16S network 400 and load operations on the WAM16L network 500. The connectivity matrix 670 is obtained by multiplying the store connectivity matrix 600 with the load connectivity matrix 630. Such multiplication produces the completely connected matrix 670 shown in FIG. 6C. The advantage indicated by the completely connected matrix 670 is that complete connectivity is achieved with less connection cost than a cross bar switch. It is also possible to pipeline stores and loads such that an effective shortened cycle communication throughput may be obtained while still achieving complete connectivity. For example, with store and load execution times of a single cycle, an effective single cycle communication throughput may be obtained by overlapping store and load operations using software pipelining methods.

Figure 7:
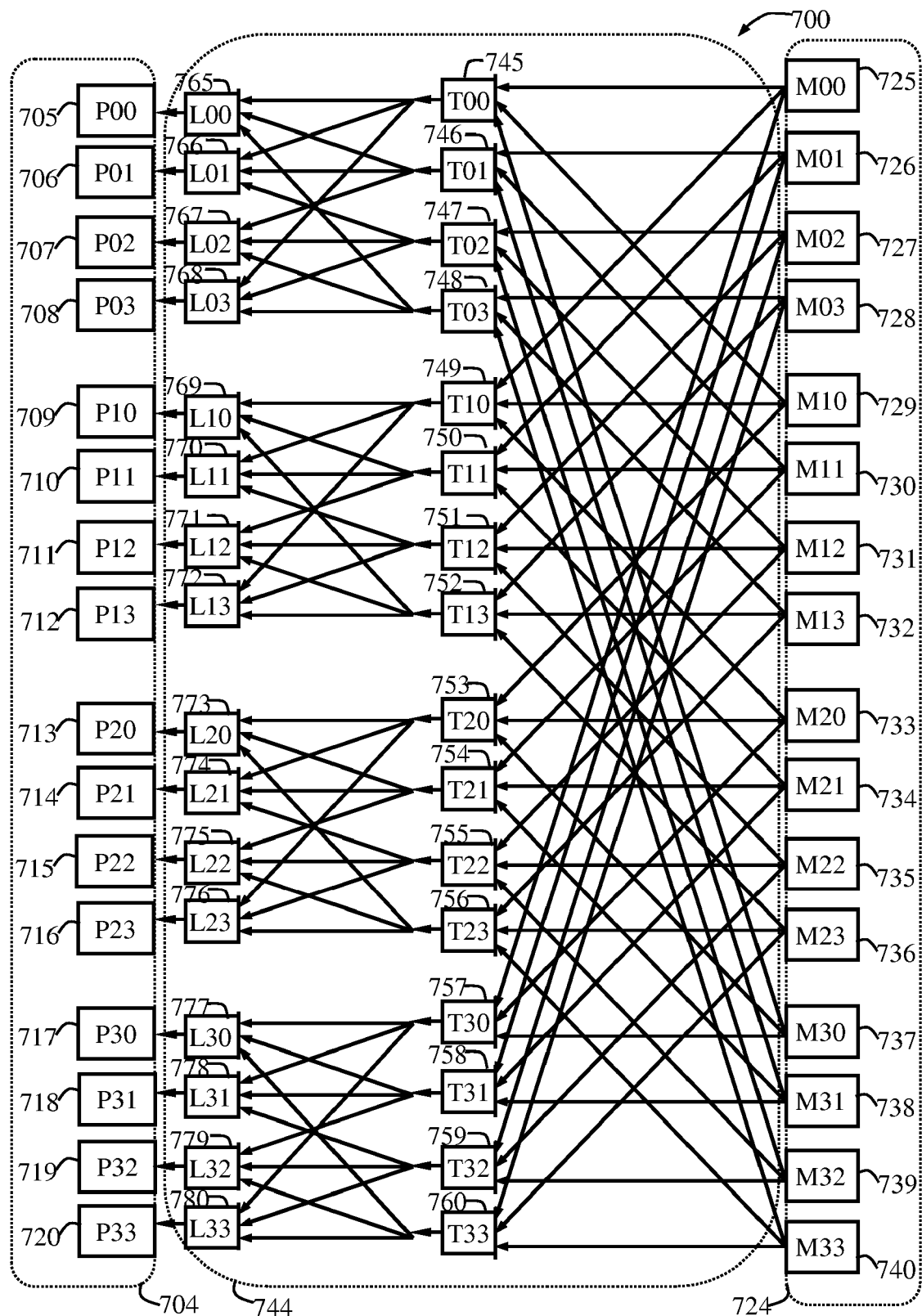
FIG. 7 illustrates an alternative WAM16L network for the purpose of showing the symmetric nature of the WAM network in accordance with the present invention.

FIG. 7 illustrates an alternative WAM16L network 700 for the purpose of showing the symmetric nature of the WAM network. Both the WAM16L network 500 and the WAM16L network 700 have the same load connectivity matrix and can be used interchangeably.

The adjacency of nodes is represented by a G×H matrix where the nodes of the matrix, may be processors, memory blocks, multiplexers, or the like having nodes $N_{g,h}$ where $g \in \{0,1,\ldots,G-1\}$ and $h \in \{0,1,\ldots,H-1\}$. A connection network, such as, the alternative WAM16L network 700 of FIG. 7, may be generalized as having a first set of nodes, such as memory nodes $M_{g,h}$, for example, connects to a second set of nodes $T_{g,h}$ which connects to a third set of nodes $L_{g,h}$. The third set of nodes $L_{g,h}$ then connects to a fourth set of nodes, such as processor nodes $P_{g,h}$, for example. The load connectivity of the nodes can be viewed as having nodes $T_{g,h}$ connect as follows:

| Inputs of Node | Connects to the outputs of the Nodes | Where |
|---|---|---|
| $T_{g,h}$ | $M_{g,h}$, $M_{g+1,h}$, and $M_{g-1,h}$ | g + 1 wraps to 0 when g + 1 = G and g − 1 wraps to G − 1 when g − 1 = −1 |

The nodes $L_{g,h}$ connect as follows:

| Inputs of Node | Connects to the outputs of the Nodes | Where |
|---|---|---|
| $L_{g,h}$ | $T_{g,h}$, $T_{g,h+1}$, and $T_{g,h-1}$ | h + 1 wraps to 0 when h + 1 = H and h − 1 wraps to H − 1 when h − 1 = −1 |

The nodes $P_{g,h}$ connect as follows:

| Input of Node | Connects to the output of the Node |
|---|---|
| $P_{g,h}$ | $L_{g,h}$ |

Figure 8A:
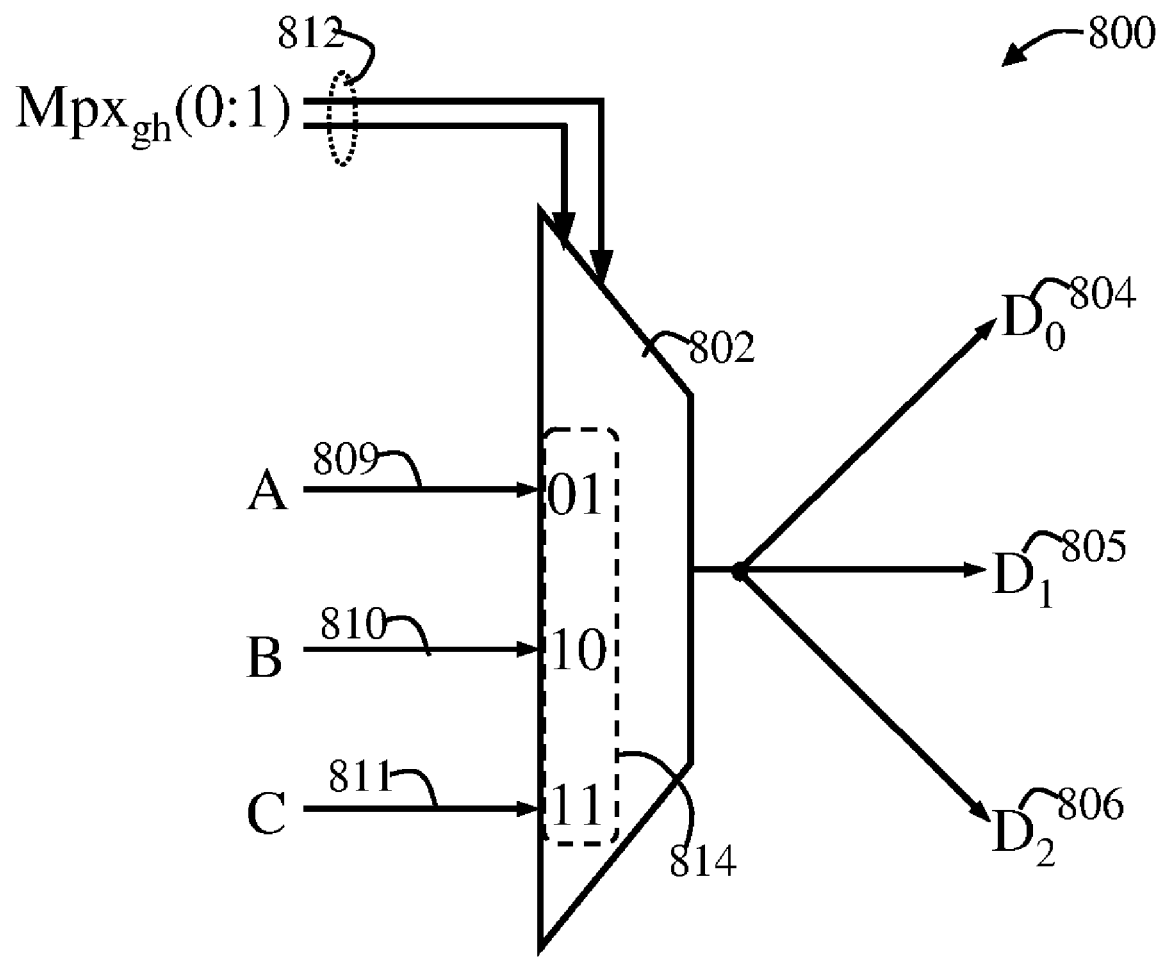
FIG. 8A illustrates a construction of a WAM network node using a four to one multiplexer with a fan out to three locations in accordance with the present invention.

FIG. 8A illustrates a WAM network node 800 constructed using a three to one multiplexer 802 with a fan out to three locations 804-806. The multiplexer has three inputs 809-811 as selected by $\text{mpx}_{g,h}(0{:}1)$ control signals 812. The states of the control signals 812 are shown in columnar format 814 inside the multiplexer 802. When the control signals 812 are in a specific state, the input associated with that state is transferred to the multiplexer output that fans out to three places 804-806. For example, multiplexer control signals 812 set at "10" cause the value on input 810 to be sent to the three fan out locations 804-806. The WAM network node 800 would be suitable for using as nodes in the WAM16S Rxx nodes 445-460 of FIG. 4A, Sxx nodes 465-480 of FIG. 4A, WAM16L Txx nodes 545-560 of FIG. 5A, Lxx nodes 565-580 of FIG. 5A, alternative WAM16L Txx nodes 745-760 of FIG. 7, and Lxx nodes 765-780 of FIG. 7.

Figure 8B:
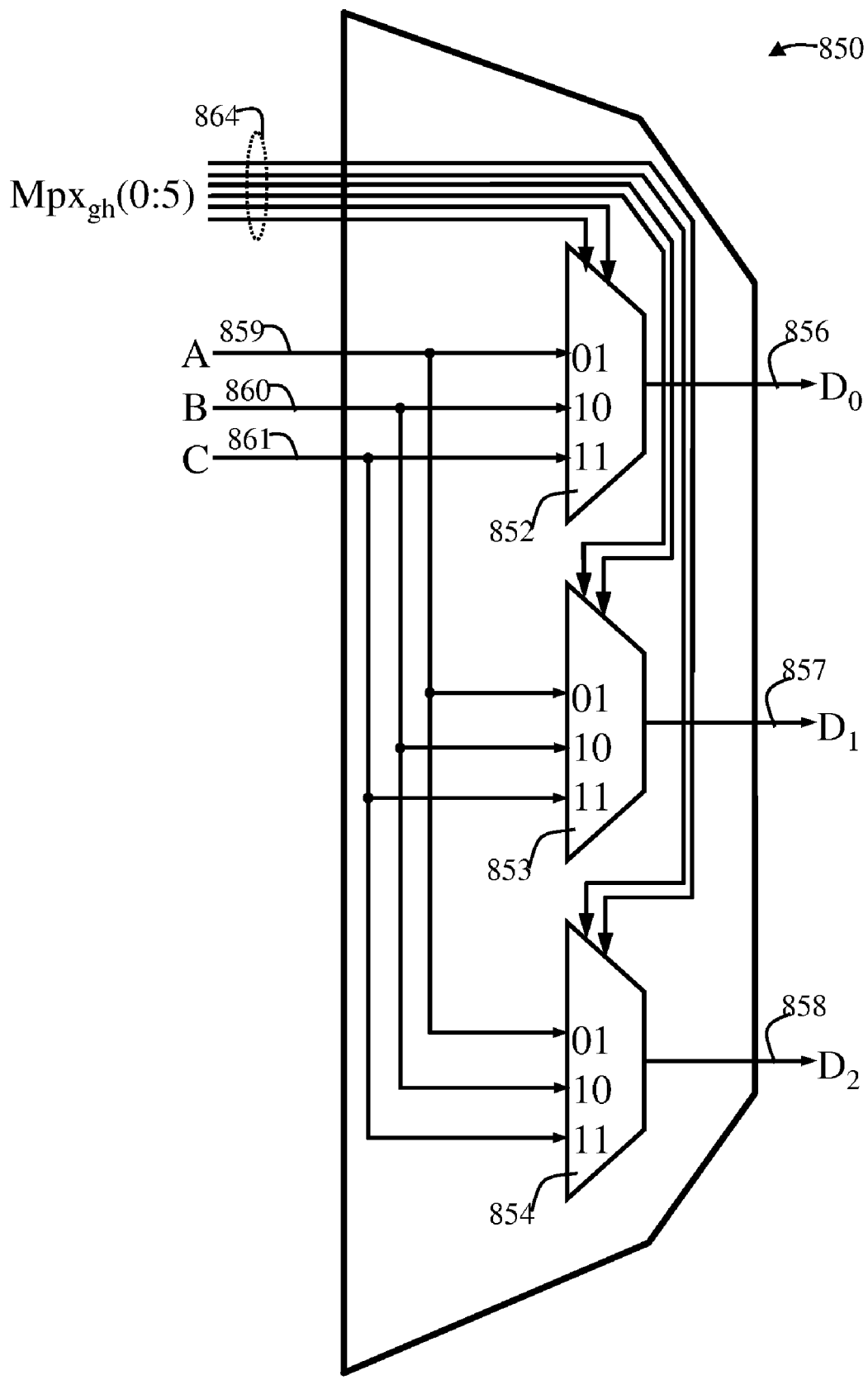
FIG. 8B illustrates an alternative construction of a WAM network node using three four to one multiplexers each with a single fan out to a separate location in accordance with the present invention.

FIG. 8B illustrates an alternative WAM network node 850 constructed using three three to one multiplexers 852-854 each with a single fan out 856-858 to a separate location. The external inputs 859-861 to the alternative WAM network node 850 have the same source as the input signals 809-811 of the WAM network node 800 of FIG. 8A. Each output 856-858 of the alternative WAM network node 850 is separately sourced by its associated multiplexer 852-854, respectively. Since there are three 3 to 1 multiplexers 852-854 in the alternative WAM network node 850, there are three sets of control signals with two lines each comprising $\text{mpxgh}(0{:}5)$ 864 required to appropriately control the three multiplexers 852-854.

Figure 9A:
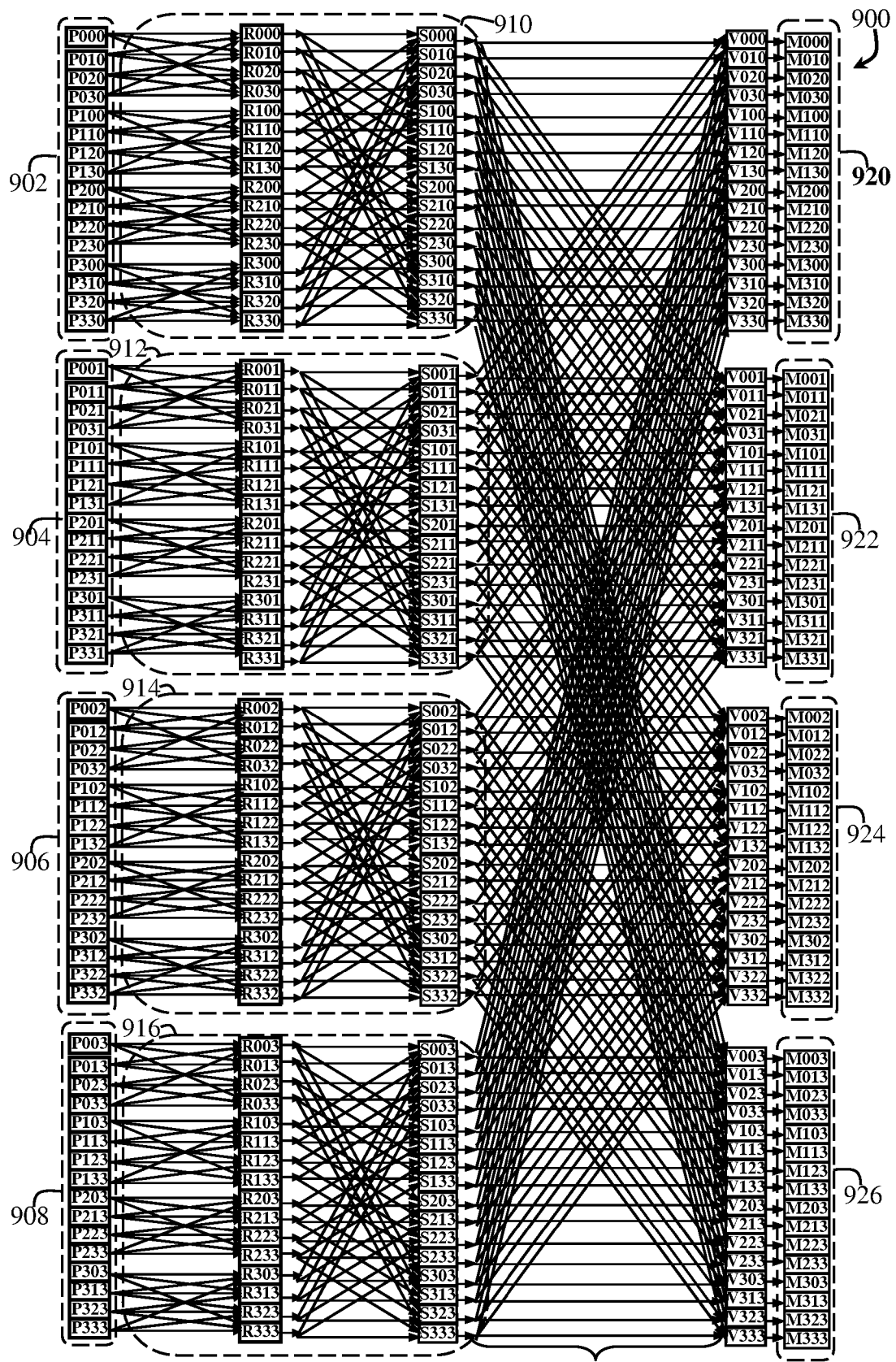
FIG. 9A illustrates a WAM sixty-four processor (64) store (WAM64S) network showing the scalable nature of the Wings array memory network in accordance with the present invention.

FIG. 9A illustrates a WAM sixty-four processor (64) store (WAM64S) network 900 showing the scalable nature of the Wings array memory network. Each group of 16 processors 902, 904, 906, and 908 are connected to a WAM16S network 910, 912, 914, and 916, respectively. The WAM16S networks 910, 912, 914, and 916 are of the same type as the WAM16S network 400. Note that the processor notation, the multiplexer node notation, and the memory notation are based on G×H×K 3 dimensional (3D) cube organization, where G represents the number of rows on a plane, H represents the number of columns on the plane, and K represents the number of planes in the 3D cube organization. A processor $P_{g,h,k}$, a memory $M_{g,h,k}$, a node $R_{g,h,k}$, a node $S_{g,h,k}$, and a node $V_{g,h,k}$ are labeled in a row g by column h by plane k format where $g \in \{0,1,\ldots,G-1\}$, $h \in \{0,1,\ldots,H-1\}$, and $k \in \{0,1,\ldots,K-1\}$. The WAM 64S network has G=4, H=4, and K=4. The processors $P_{g,h,k}$, the memory bocks $M_{g,h,k}$, the multiplexers $R_{g,h,k}$, the multiplexers $S_{g,h,k}$, and the multiplexers $V_{g,h,k}$ are labeled in the figures as Pghk, Mghk, Rghk, Sghk, and Vghk, respectively, for ease of notation and reference in the figures. The WAM64S network has three stages, two stages for the four WAM16S networks 910, 912, 914, and 916 and one stage 918 for the K planes that connects to the 64 memory blocks 920, 922, 924, and 926. A WAM64L network would be symmetric to the WAM64S network 900 in the same manner that the WAM16L network 700 is symmetric to the WAM16S network 400.

Figure 9B:
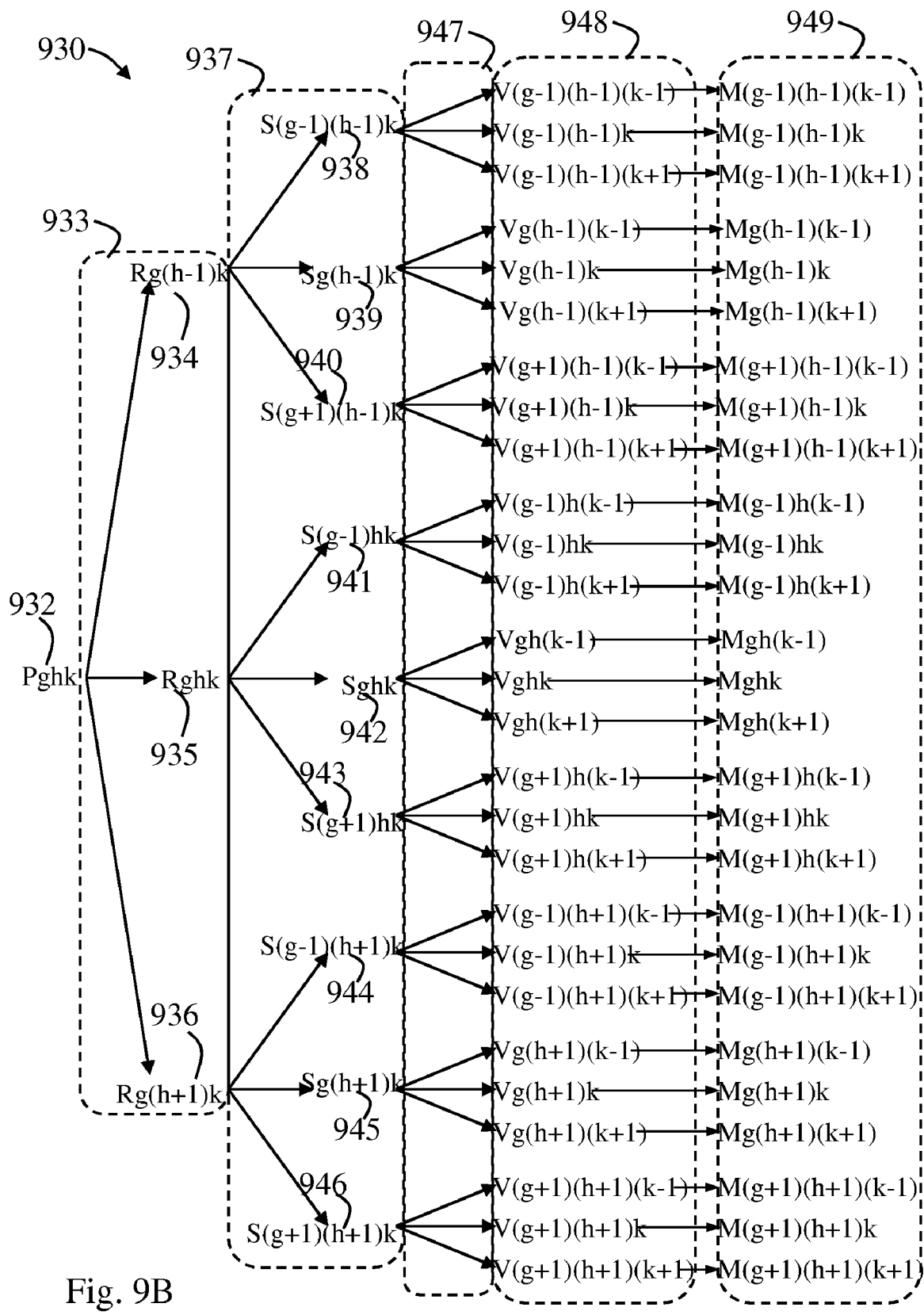
FIG. 9B illustrates a general form of a store path selected from the WAM64S network of FIG. 9A in accordance with the present invention.

FIG. 9B illustrates a general form of a store path 930 selected from the WAM64S network 900. The store path begins at $P_{g,h},k$ 932 connecting to a first stage 933 of a WAM16S network to three R nodes 934-936. The three R nodes 934-936 connect to a second stage 937 of the WAM16S network to nine S nodes 938-946. The nine S nodes 938-946 connect through a WAM network stage 947 to twenty seven V nodes 948 that each connect directly to a corresponding memory block in the twenty seven memory blocks 949.

Figure 9C:
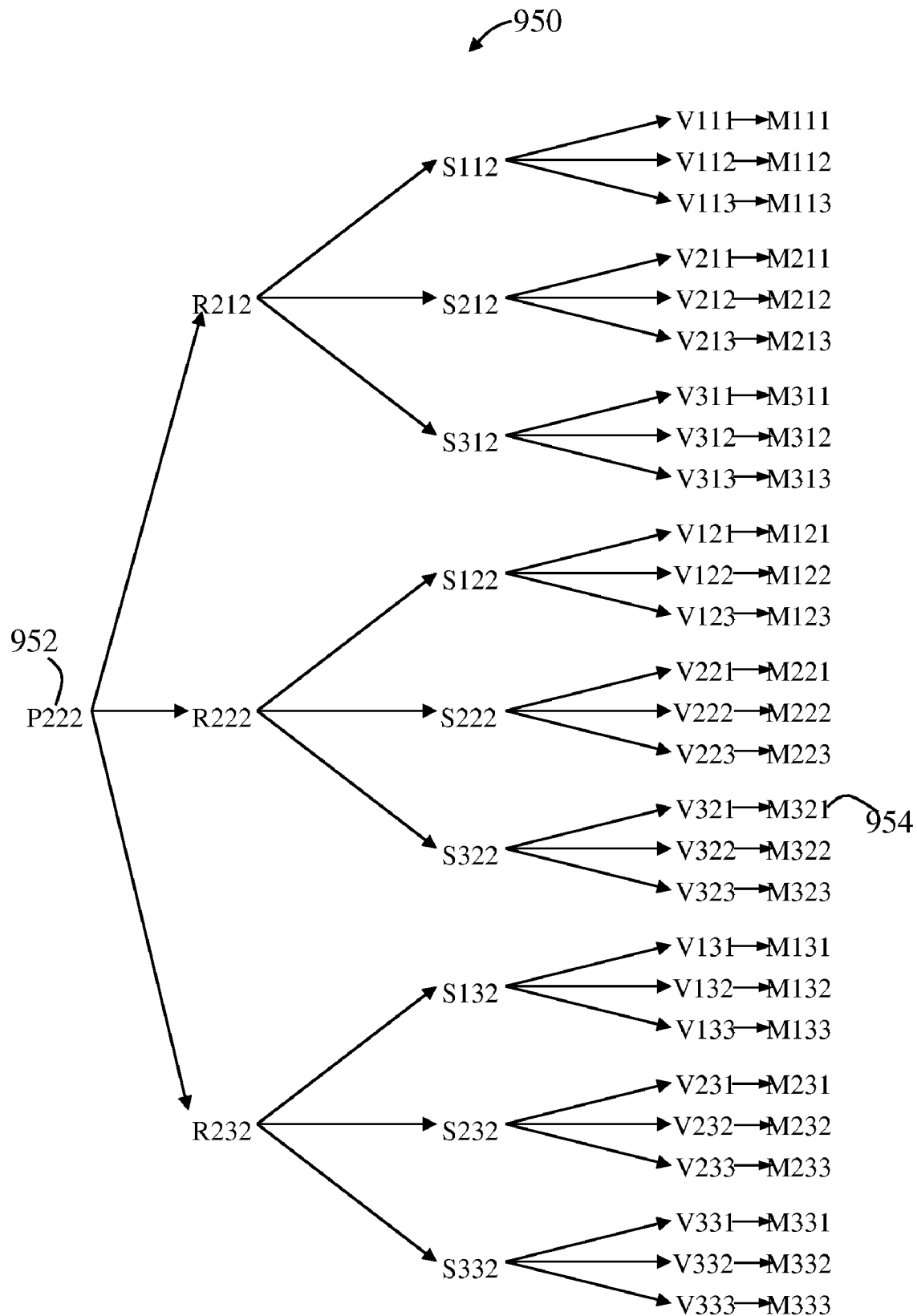
FIG. 9C illustrates a store path selected from the WAM64S network of FIG. 9A in accordance with the present invention.

FIG. 9C illustrates a store path 950 selected from the WAM64S network 900. The store path 950 begins at $P_{2,2,2}$ 952. This store path 950 is formed by substituting g=2, h=2, and k=2 in the subscripted notation of the general form of a store path 930 in FIG. 9B. The node numbers wrap within the range 0-3 for rows g, columns h, and planes k. An example memory node is memory node $M_{3,2,1}$ 954.

Figure 9D:
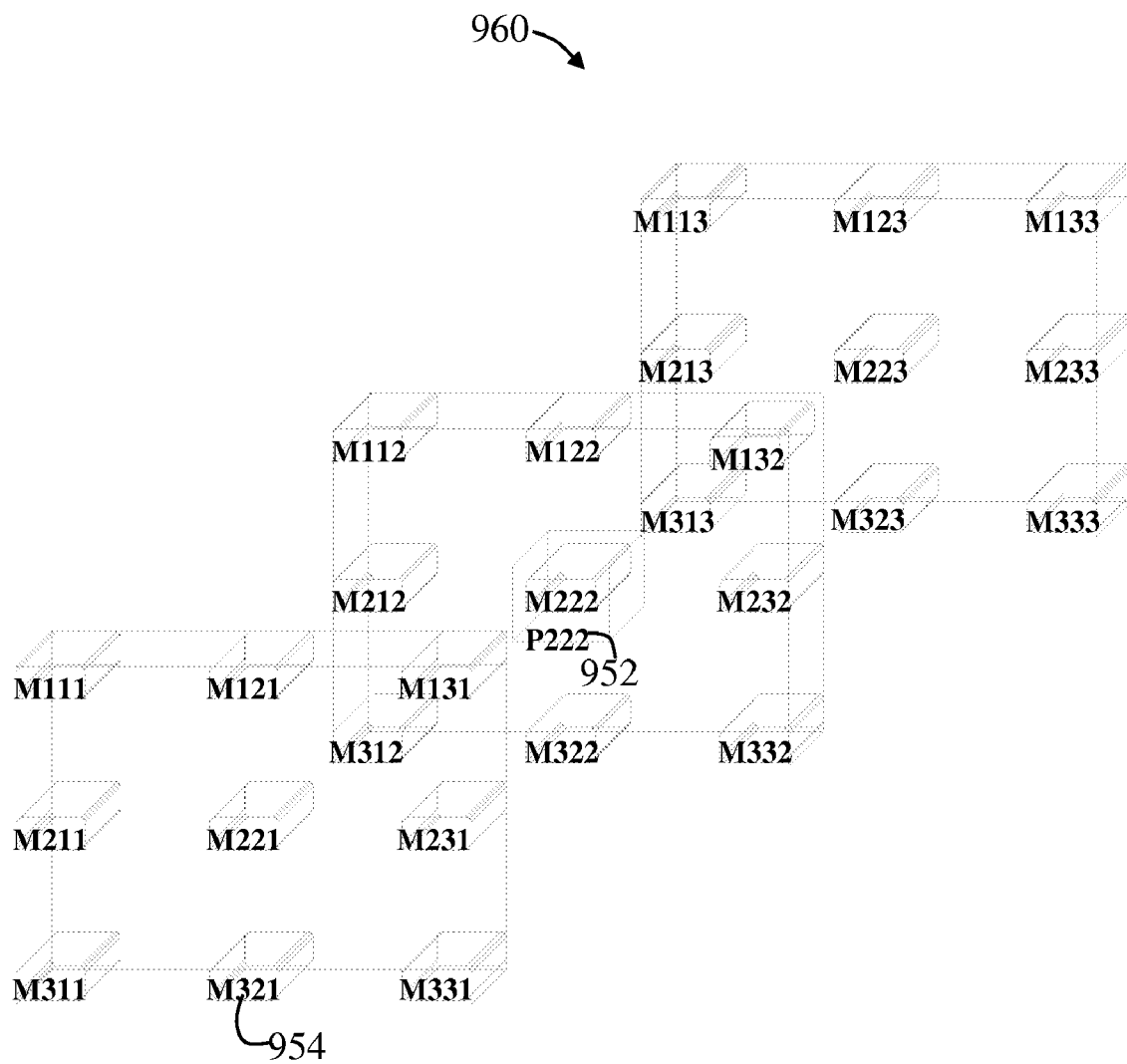
FIG. 9D illustrates a three dimensional organization of the twenty seven memory nodes and processor $P_{2,2,2}$ of FIG. 9C in accordance with the present invention.

FIG. 9D illustrates a three dimensional organization 960 of the twenty seven memory nodes and processor $P_{2,2,2}$ 952 of FIG. 9C. The store path begins at $P2_{,2,2}$ 952 and connects to the twenty seven memory nodes, such as memory node $M_{3,2,1}$ 954.

Figure 9E:
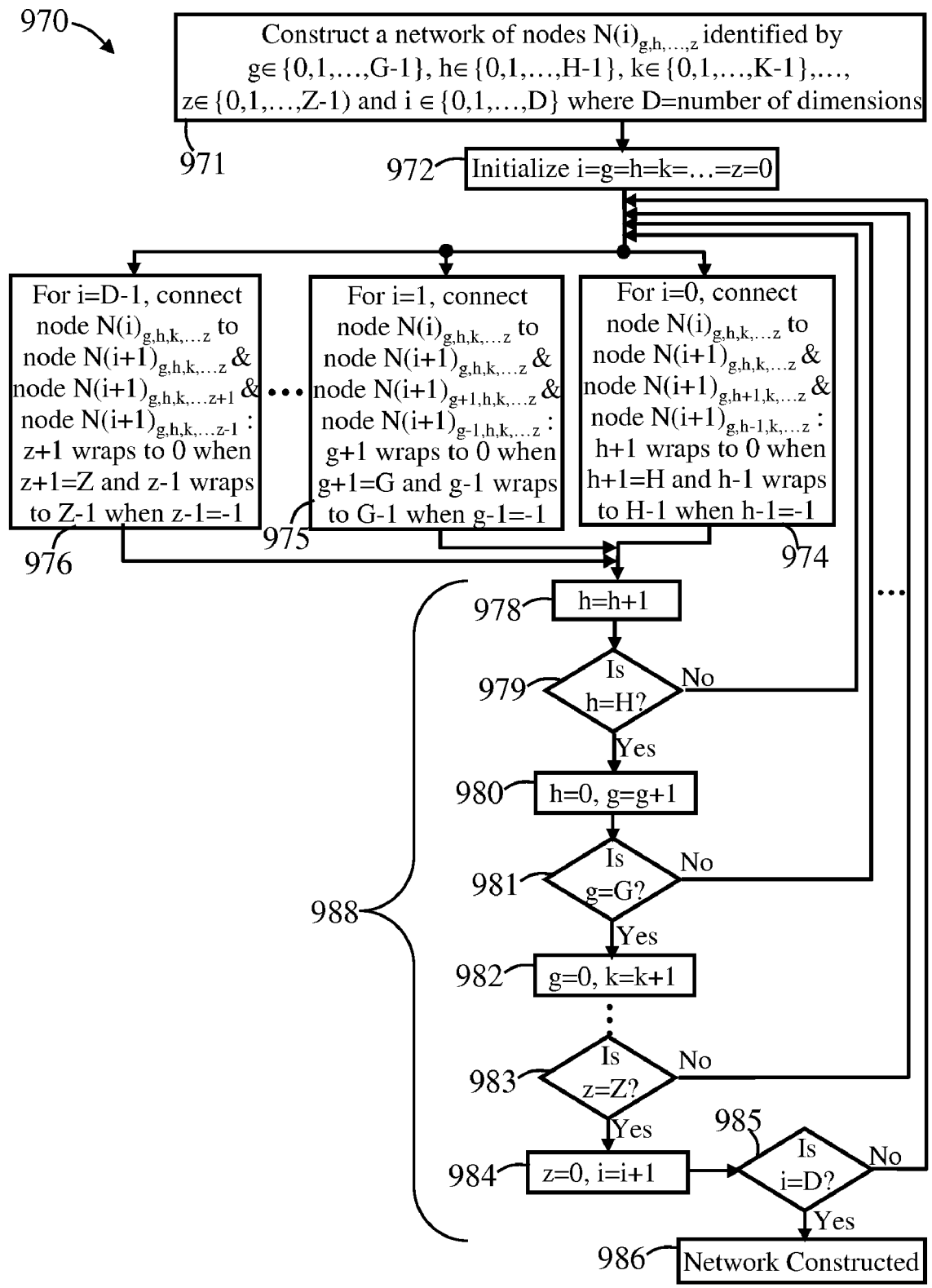
FIG. 9E illustrates a method of constructing a network in accordance with the present invention.

FIG. 9E illustrates a method 970 of constructing a network in accordance with the present invention. The method starts in step 971 where a network of nodes is identified by $g \in \{0, 1, \ldots, G-1\}$, $h \in \{0,1, \ldots, H-1\}$, $k \in \{0,1, \ldots, K-1\}, \ldots, z \in \{0,1, \ldots, Z-1\}$ and $i \in \{0,1, \ldots, D\}$ where D is the number of dimensions. In step 972, variables i, g, h, k, . . . ,z are initialized to zero.

For i=0 step 974, the first stage of the network is constructed connecting node $N(i)_{g,h,k,\ldots,z}$ to node $N(i)_{g,h,k,\ldots,z}$ and to node $N(i+1)_{g,h+1,k,\ldots,z}$ and to $N(i+1)_{g,h-1,k,\ldots,z}$ where h+1 wraps to 0 when h+1=H and h−1 wraps to H−1 when h−1=−1. In step 978, the variable h is incremented by 1. In step 979 it is determined whether h=H. If h does not equal H, then the method returns to step 974. If h does equal H, then the method proceeds to step 980.

In step 980, the variable h is set to zero and the variable g is incremented by 1. In step 981, it is determined whether g=G. If g does not equal G, then the method returns to step 974. If g does equal G, then the method proceeds to step 982.

In step 982, the variable g is set to zero and the variable k is incremented by 1. The method 970 continues in like manner for the dimensions up to the test for the last dimension in step 983. In step 983, it is determined whether z=Z. If z does not equal Z, then the method returns to step 974. If z does equal Z, then the method proceeds to step 984.

In step 984, the variable z is set to zero and the variable i is incremented by 1. In step 985, it is determined whether i=D. If i does not equal D, then the method proceeds to step 975 with i=1. If i does equal D, then the method stops at step 986 having constructed the network.

For i=1 step 975, the second stage of the network is constructed connecting node $N(i)_{g,h,k,\ldots,z}$ to node $N(i+1)_{g,h,k,\ldots,z}$ and to node $N(i+1)_{g+1,h,k,\ldots,z}$ and to $N(i+1)_{g-1,h,k,\ldots,z}$ where g+1 wraps to 0 when g+1=G and g−1 wraps to G−1 when g−1=−1. In step 978, the variable h is incremented by 1. From step 975, the method proceeds to step 978 and the process is repeated from step 978 through to the step 984. In step 984, the variable z is set to zero and the variable i is incremented by 1. The method continues constructing stages of the network until the point is reached where i=D−1. In step 985 at this point, the process proceeds to step 976 to construct the last stage of the network. Once the last stage of the network has been constructed, the method returns to step 984 and increments the variable i by 1, such that i=D. In step 985, it is determined that i=D and the method proceeds to step 986 having constructed the network. It is noted that steps 988 are adjusted for the number of dimensions D of the network to be constructed. For example, if D=2, as would be the case for the WAM16S network 400 of FIG. 4A, then only variables g and h would be required and steps 982 through steps 983 would not be required. Also, step 984 would be adjusted to g=0, i=i+1.

The WAM16S network 400 of FIG. 4A may be constructed by use of the method 970 where the dimensions (D) is 2. The method 970 would for D=2 follow the steps illustrated in FIG. 9E including step 974 and step 975. Step 974 for i=0 and steps 988 adjusted for D=2 are used to construct the first stage of the WAM16S network 400 between the processors P00 405 through P33 420 and the multiplexers R00 445 through R33 460. Step 975 for i=1 and steps 988 adjusted for D=2 are used to construct the second stage of the WAM16S network 400 between the multiplexers R00 445 through R33 460 and the multiplexers S00 465 through S33 480.

Figure 10A:
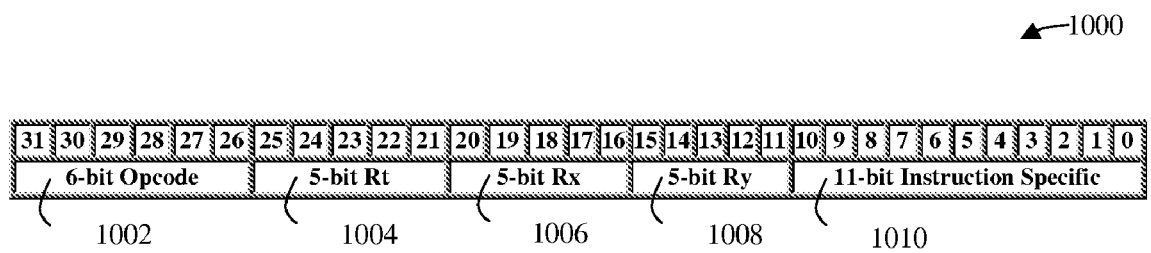
FIG. 10A illustrates a generic type of prior art arithmetic instruction format.

FIG. 10A illustrates a generic type of arithmetic instruction format 1000. The arithmetic instruction 1000 is made up of a 6-bit opcode 1002, a 5-bit Rt register target field 1004, a 5-bit Rx register source field 1006, a 5-bit Ry register source field 1008, and an 11-bit instruction specific field 1010. This format is typical for a processor having a central register file from which arithmetic operands are sourced and arithmetic results are targeted. A thirty two entry register file of, for example, 32-bits, organized as a 32×32-bit multi-port register file, is a typical processor register file requiring 5-bit addressing for each port for direct access of operands. In a memory to memory processor which accesses operands from a memory, the specification of the source and target addresses in the arithmetic instruction typically accommodates a wider addressing range. The wider addressing range is obtained either directly through wider operand address fields in an instruction or through indirect forms of addressing using external addressing registers set up ahead of time.

Figure 10B:
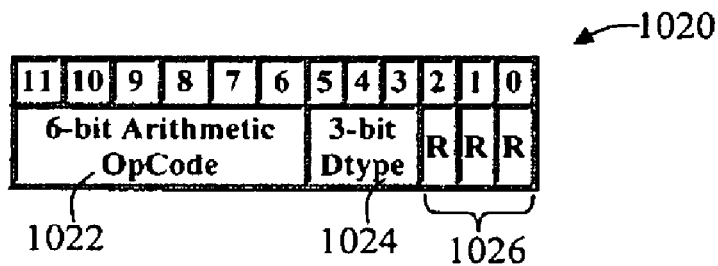
FIG. 10B illustrates a Wings basic arithmetic/logic instruction format in accordance with the present invention.
Figure 10C:
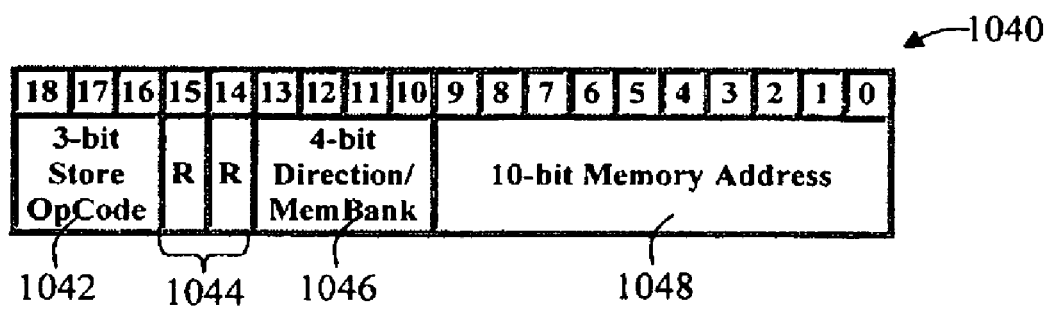
FIG. 10C illustrates a Wings basic store instruction format in accordance with the present invention.
Figure 10D:
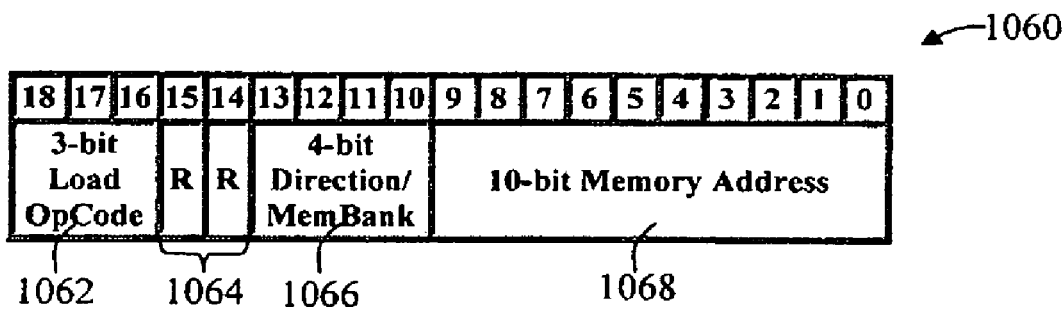
FIG. 10D illustrates a Wings basic load instruction format in accordance with the present invention.

In most processors, a fixed instruction format size is used, such as, 8, 16, 24, 32 and 64 bits or a combination of such instruction formats. FIG. 10A shows one such 32-bit instruction format 1000. The space allocated in the 32-bit instruction format 1000 for three operand address fields 1004, 1006, and 1008 is necessarily limited, since the other instruction bits, such as 1002 and 1010, are required to specify operations necessary in order to execute the instruction as specified by the processor's architecture. In order to break this limitation and provide greater flexibility in specifying operand addresses, for example, with greater range and flexible accessing methods, a new processor architecture, referenced as the Wings architecture, splits a typical instruction format into three separate new types of instruction formats each more optimally organized for their intended purposes. A first instruction format, an arithmetic/logic instruction format 1020, is shown in FIG. 10B to be used to specify arithmetic, logical, shift, bit manipulation, and the like operations. A second instruction format, a store instruction format 1040, is shown in FIG. 10C to be used to specify operations to store results of arithmetic operations to memory. A third instruction format, a load instruction format 1060, is shown in FIG. 10D to be used to specify the accessing of operand data from memory for delivery to execution units. These and other variations are discussed further below.

For example, FIG. 10B illustrates a Wings basic arithmetic/ logic (AL) instruction format 1020 having 12-bits to define the operation. The AL format 1020 has no memory source or target operand address fields. A 6-bit opcode field 1022, a 3-bit data type (Dtype) 1024, and three arithmetic/logic instruction specific bits 1026 are all that is required to specify an arithmetic operation in the 12-bit AL instruction format 1020. The Wings processor architecture specifies that whatever data is at the inputs to an AL unit at the start of an execution cycle that is the data received in the AL unit and operated on by the AL unit. The Wings processor architecture also specifies that the results of execution are available at the output of the AL unit at the end of the execution cycle or cycles. An AL instruction does not specify a target storage address in a central register file or a memory unit where the results may be stored. In order to provide operands to an AL unit and store results from an AL unit, an AL instruction must be paired with a load and a store instruction or other such instruction or instructions to provide source operands and to take result operands for further processing or storage.

For example, FIG. 10C illustrates a Wings basic store instruction format 1040 having 19-bits to define the operation. The store instruction format 1040 uses a 3-bit store opcode 1042, two store instruction specific bits 1044, a 4-bit direction/memory bank (MemBank) selection field 1046, and a 10-bit memory address 1048 in the 19-bit instruction format. As specified by the opcode 1042 or in combination with the store instruction specific bits 1044, the store instruction causes a result to be taken from a specified execution unit and store the result to the target memory address. The target memory address is determined from the combination of the 4-bit direction/MemBank selection field 1046 and the 10-bit memory address 1048. Direct, indirect, and other addressing forms may be specified using separate addressing registers if required.

Figure 10E:
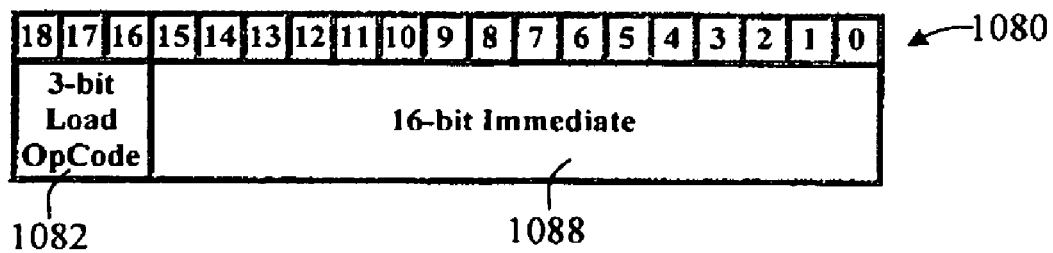
FIG. 10E illustrates a Wings basic load immediate format in accordance with the present invention.

FIG. 10D illustrates a Wings basic load instruction format 1060 having 19-bits to define the operation. The load instruction format uses a 3-bit load opcode 1062, two load instruction specific bits 1064, a 4-bit direction/memory bank (MemBank) selection field 1066, and a 10-bit memory address 1068 in the 19-bit instruction format. As specified by the opcode 1062 or in combination with the load instruction specific bits 1064, the load instruction fetches at least one source operand from a specified memory address for delivery to an execution unit. The memory address is determined from the combination of the 4-bit direction/MemBank selection field 1066 and the 10-bit memory address 1068. Direct, indirect, and other addressing forms may be specified using separate addressing registers if required. FIG. 10E illustrates a Wings basic load immediate format 1080 having 19-bits to define the operation. The load immediate format uses a 3-bit load immediate opcode 1082 and a 16-bit immediate field 1088 in the 19-bit instruction format. The 3-bit load immediate opcode 1082, for example, may specify the execution unit that is to use the immediate data.

It is anticipated the depending upon the application the processor architecture may expand or contract the illustrated instruction formats. For example, 8-bit arithmetic and 16-bit load and store instruction formats, and 16-bit arithmetic and 24-bit load and store instruction formats can be envisioned, as well as other variations, such as, 14-bit arithmetic and 25-bit load and store instruction formats. The instruction format is determined primarily from the number of and type of operations to be specified for each class of instruction.

A secondary consideration may be how the instructions are packed for storage as programs in external memory. For example, with use of base address registers local in the PEs, a dual load instruction may be specified that selects two source operands from blocks of memory by generating two addresses. The dual load instruction would be used in place of two single load instructions. With a dual load instruction format of 27-bits, a store instruction of 23-bits, and an arithmetic instruction of 14-bits, a packed instruction storage space of 64-bits would be required. The packed instruction storage space could be unpacked locally to the processor when loading instruction memories, for example, as may be specified in direct memory access (DMA) type operations. Instruction memories, such as the execution unit instruction memories of a Wings processor may be used. See U.S. Provisional Application Ser. No. 10/648,154 entitled "Methods and Apparatus For Meta-Architecture Defined Programmable Instruction Fetch Functions Supporting Assembled Variable Length Instruction Processors", which is incorporated by reference in its entirety.

Figure 11A:
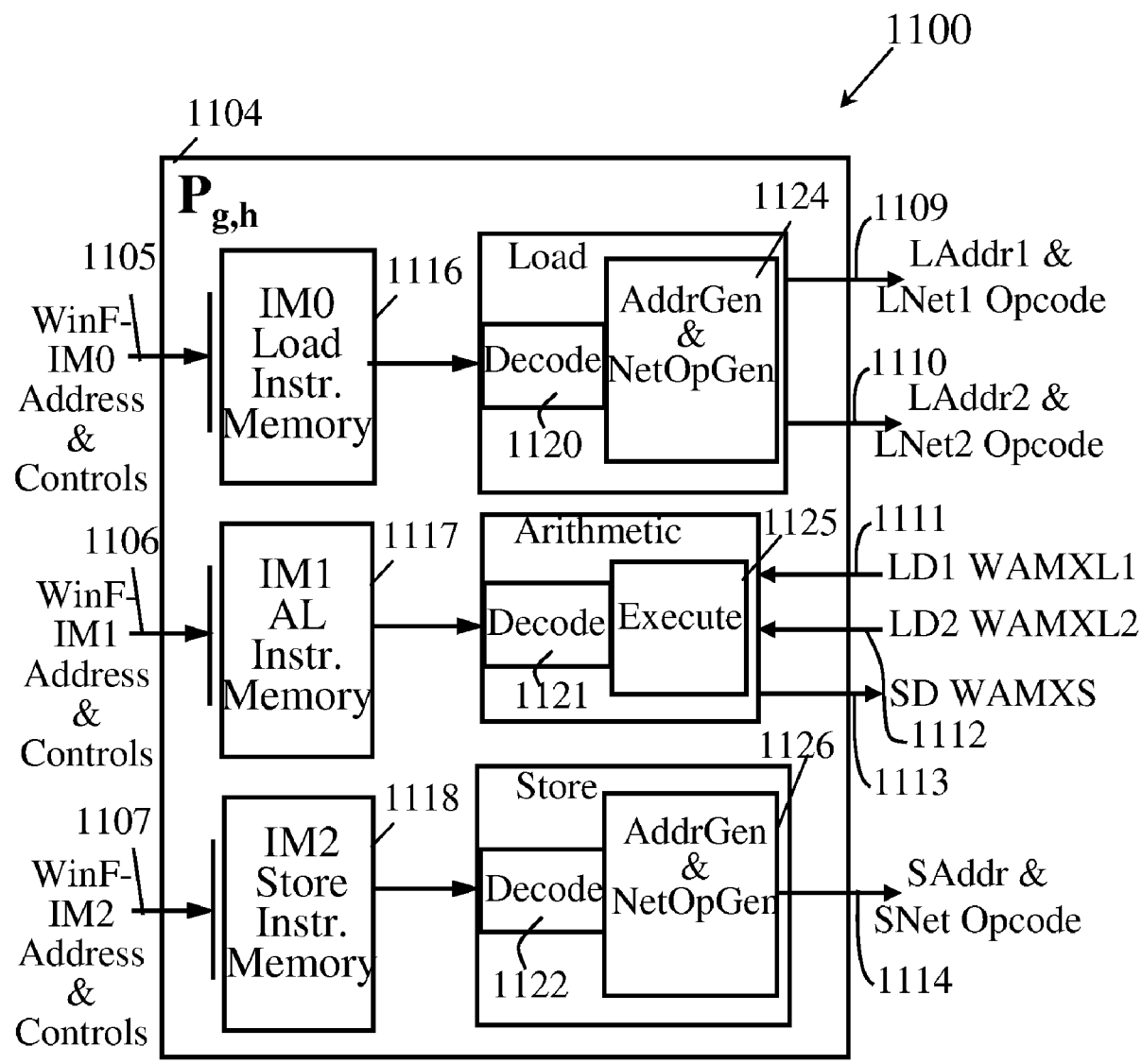
FIG. 11A illustrates a Wings processor node for use with the WAM networks and using the Wings basic instruction formats in accordance with an embodiment of the present invention.

FIG. 11A illustrates a Wings processor node 1100 for use with the WAM networks, such as the WAM16S network 400, WAM16L network 500 and 700, and WAM64S network 900. The Wings processor node 1100 uses the Wings basic instruction formats, 1020, 1040, 1060, and 1080. The Wings processor node 1100 consists of a processor $P_{g,h}$1104 with input connections for instruction memory addresses WinF-IM0 address and controls 1105, WinF-IM1 address and controls 1106, and WinF-IM2 address and controls 1107. The processor $P_{g,h}$1104 has output connections for WAM network connections 1109-1114 which are described in more detail below.

As noted above, the 12-bit arithmetic and 19-bit load and store instruction formats are one set of example formats that can be specified for the processor nodes. Depending upon the application, the number and type of unique instructions may require different instruction formats in order to meet the requirements. It was also noted that it is desirable to optimize the instruction format to the needs of the instruction type, such as arithmetic/logic instructions, load and store instructions for example. Since the instruction formats may take various numbers of bits, an architecture supporting a wide variety of formats is required. The Wings architecture, as described in US Patent Application Publication US 2004/0039896, is an architecture that would allow different instruction sizes for each instruction type supported by a separate instruction memory unit. The Wings architecture supplies instruction addresses to local instruction memories in each processor, such as load instruction memory IM0 1116, arithmetic instruction memory IM1 1117, and store instruction memory IM2 1118 to select an instruction from each memory. The selected instruction is supplied on individual instruction buses to separate decode units 1120-1122 and then executed in each separate execution unit 1124-1126, respectively.

The load execute unit 1124 generates a data fetch address or load address for each load instruction supplied by the load instruction memory IM0 1116. For example, if two load instructions were supplied then two load addresses and network opcodes would be generated, such as load address 1 & load network 1 opcode 1109 and load address 2 & load network 2 opcode 1110. These fetch addresses and network opcodes are set through the network to each multiplexer node that is under control of the processor. In the WAM16L network 700, each processor node $P_{g,h}$, for example, controls the network node associated with the direct path to memory block $M_{g,h}$. For example in FIG. 7, processor P03 708 controls nodes L03 768 and T03 748, processor P21 714 controls nodes L21 774 and T21 754. In a single instruction multiple data (SIMD) mode of operation, each direction associated with a load and store instruction from all the nodes involved in the operation provide the same direction command code. For example, a load from the east would be specified in a bit field of a load instruction and that bit field portion of the load instruction would be the same for all load instructions in all processors involved in the operation. It is appreciated that different execution specific instruction operations such as different directions of load or store operations may be specified among a group of executing nodes where the communication operations do not conflict. As another example, in a specified group of processor nodes the non-communication oriented bit field portions of the load instructions may be different for each processor node such that data from different memory addresses may be fetched. When data is returned through the WAM network, it is loaded directly to the arithmetic unit of each processor that is doing a load operation, for example, receiving load data on load operand 1 WAMXL1 1111 and load operand 2 WAMXL2 1112.

To associate an arithmetic operation with a load instruction, the latency of the fetch through the WAM network must be accounted for. For example, with a single cycle allocated to address a memory block and obtain the data at the memory block output and a single cycle allocated to transfer the fetched data across the network to a processor node, two cycles may be used for a data load operation.

Store operations follow a similar path with a store operand data at a specified memory address is sent through the store WAMXS network to the memory based on the direction command in the store instruction. The store operand WAMXS 1113 and store address & store network opcode 1114 are sent through the network to the desired memory block for storage.

Figure 11B:
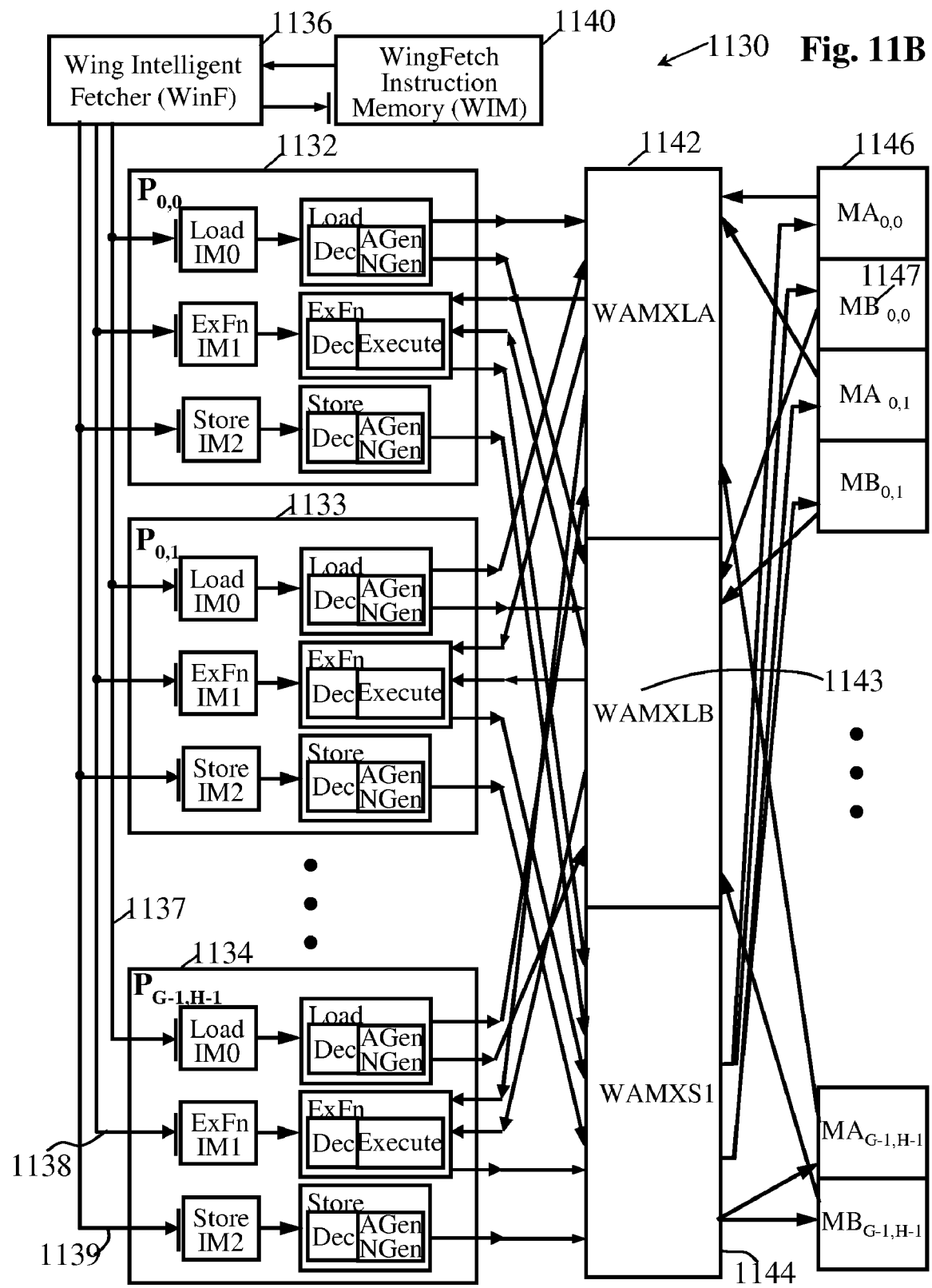
FIG. 11B illustrates an example of a WAM processor system in accordance with the present invention.

FIG. 11B illustrates an example of a WAM processor system 1130. G×H processors $P_{0,0}$ 1132, $P_{0,1}$ 1133, ..., $P_G$–1, H–1 1134 are connected to a Wings intelligence fetcher (WinF) 1136 through three instruction memory address lines 1137-1139. For example, instruction memory address and control lines 1137-1139. The memory address and control lines are similar to the WinF IM0 address and controls 1105, WinF IM1 address and controls 1106, and WinF IM2 address and controls 1107, respectively, as shown in the processor 1100 of FIG. 11A. The Wings intelligent fetcher 1136 fetches its instructions from the Wings fetch instruction memory (WIM) 1140. The multiple processors connect to data memory through WAM networks, such as two WAMXL load networks, WAMXLA 1142 and WAMXLB 1143, and a WAMXS store network WAMXS 1144. With two WAM load networks, either multi-port memories or two memory blocks per associated processor node may be used, for example. In FIG. 11B the WAM processor system 1130 uses two memory blocks per associated processor node. For example, there are two memory blocks, $MA_{0,0}$1146 and $MB_{0,0}$ 1147 associated with processor node $P_{0,0}$ 1132.

Figure 11C:
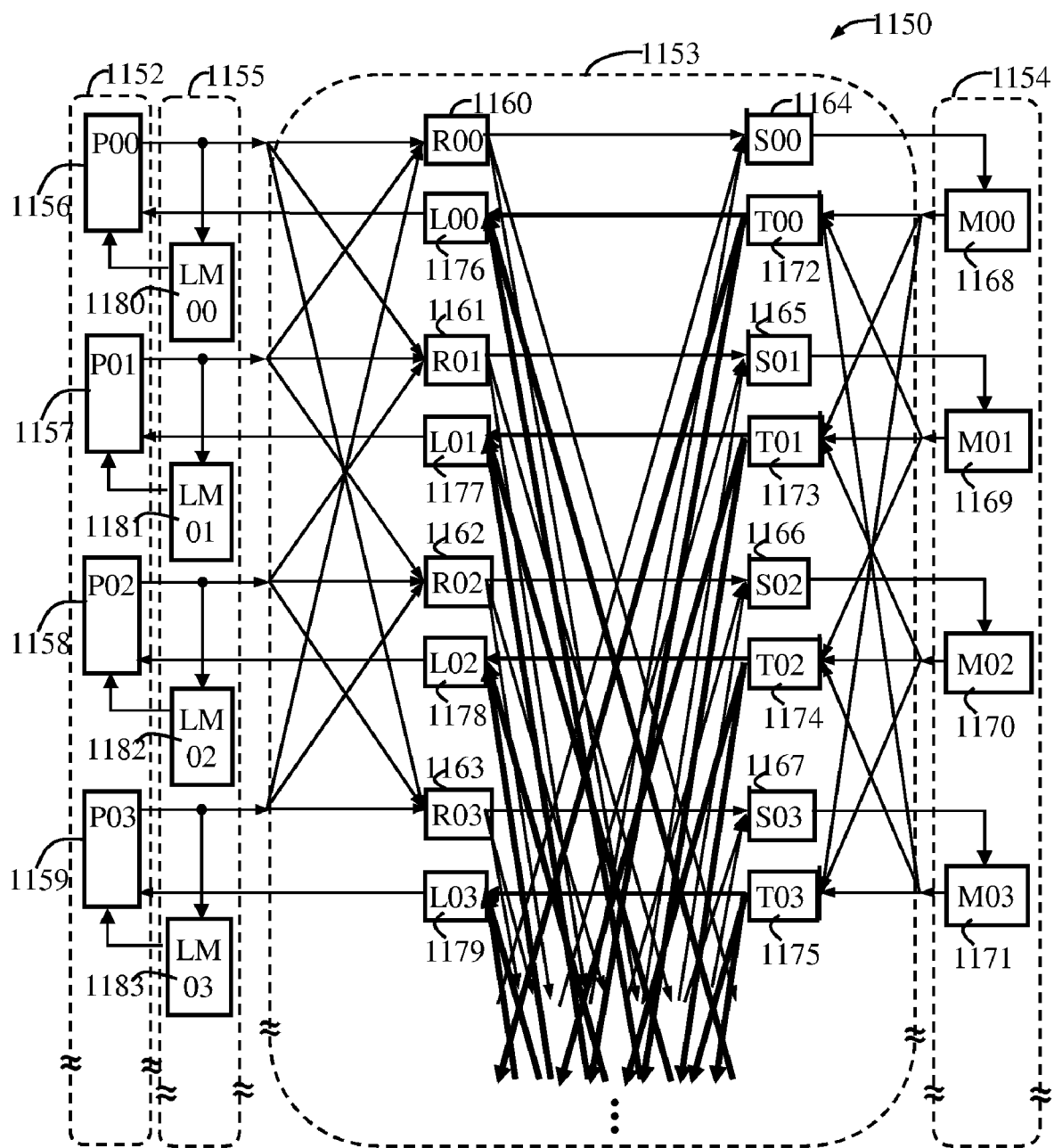
FIG. 11C illustrates a WAM16 processor subsystem with a set of processor nodes, a WAM16S/WAM16L combined network, a first set of memories, and a second set of memories in accordance with the present invention.

FIG. 11C illustrates a WAM16 processor subsystem 1150 with a set of processor nodes 1152, a WAM16S/WAM16L combined network 1153, a first set of memories 1154, and a second set of memories 1155 in accordance with the present invention. The WAM16S/WAM16L combined network 1153 is made up of a WAM16S network, such as WAM16S network 400 of FIG. 4A, and a WAM16L network, such as WAM16L network 500. The WAM16S/WAM16L combined network 1153 is used for connecting processor nodes 1152 to the first set of memories 1154. The second set of memories 1155 connects locally to the processor nodes 1152. With this organization simultaneous dual memory loads to the processor nodes 1152 can be supported. Four processor nodes 1156-1159 are illustrated in FIG. 11C that are part of a larger sixteen processor node network, such as illustrated in FIGS. 4A and 5A, for example. For store operations processor nodes 1156-1159 send data to the Rxx nodes 1160-1163. For example, processor node P01 1157 sends data to R00 1160, R01 1161, and R02 1162. The Rxx nodes 1160-1163 connect to Sxx nodes 1164-1167 and other nodes in the WAM16S/WAM16L combined network 1153. The Sxx nodes 1164-1167 connect to memories 1168-1171, respectively. Though a single block of memory is shown for each of the memories 1168-1171, it is appreciated that the memories 1168-1171 may be partitioned into multiple memory blocks each accessible by use of addressing ranges. The desired memory block may be specified through the memory address that is associated with the data being sent through the network for storage in memory.

For network load operations, a processor node initiates a network load operation by sending a data fetch address and network opcode through the network to the desired memory. The addressed memory fetches data at the specified address and send the data through the WAM16S/WAM16L combined network 1153 back to the processor node that initiated the network load operation, such as one of the processor nodes 1156-1159. The memories 1168-1171 are connected to Txx nodes 1172-1175. For example, memory M00 1168 sends data to T00 1172, T01 1173, and T03 1175. The Txx nodes 1172-1175 connect to Lxx nodes 1176-1179 and other nodes in the WAM16S/WAM16L combined network 1153. The Lxx nodes 1176-1179 connect to the processor nodes 1156-1159, respectively.

For local load operations, a processor node initiates a local load operation by sending a data fetch address directly to the local memory associated with the processor node. The local memory accesses the data and provides it locally to the requesting processor node. For example, processor nodes 1156-1159 may load data from local memories 1180-1183, respectively.

Depending upon the application and processor cycle time, it is possible to store through a WAMXS network into memory in a single cycle and to load data from a memory through a WAMXL network into a processor also in a single cycle. Such performance may be appropriate for low power applications, for example. For this type of situation, a software pipeline of storing and loading may be easily obtained providing a single cycle throughput for communicating data between processor nodes for any node in the system.

Figure 11D:
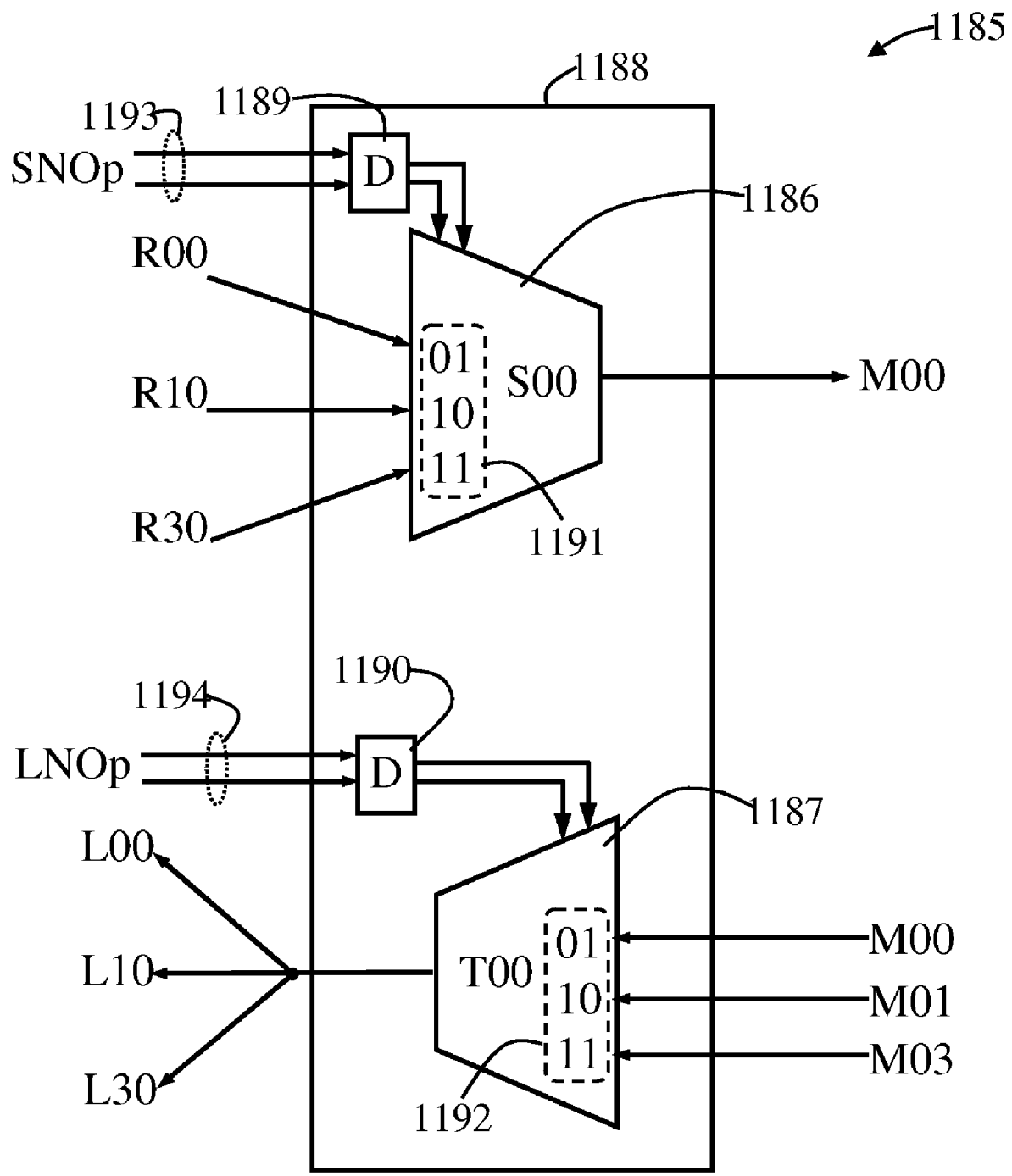
FIG. 11D illustrates a combined network node that combines a WAM16L node and a WAM16S node into a single node and illustrates the function aspect of the WAM nodes in accordance with the present invention.

FIG. 11D illustrates a combined network node 1185 that combines a WAM16S node 1186 and a WAM16L 1187 node into a single node 1188. The single node 1188 illustrates the functional aspect of the WAM nodes. The WAM16S node 1186 and WAM16L node 1187 operate under control signal inputs provided by decoder 1189 and 1190, respectively. The outputs of the decoders 1189 and 1190 are represented by the binary state lists 1191 and 1192, respectively. The decoders 1189 and 1190 receive control signals SNOp 1193 and LNOp 1194, respectively. For simple directional path control for the data through the networks, the WAM16S node 1186 and WAM16L 1187 node may be multiplexers selecting the path according to the binary state indicated in the node diagram. In an alternative embodiment, the control signals SNOp 1193 and LNOp 1194 are used directly without need for a decoder. The controls signals SNOp 1193 and LNOp 1194 connect directly to binary multiplexer control inputs that are used for controlling the multiplexers. In another alternative embodiment, the decoders 1189 and 1190 in select modes of operation pass the control signals through the decoders and providing no additional decoding function. For additional functions of the nodes 1186 and 1187, the nodes 1186 and 1187 may provide different operations on data coming into the nodes, as may be required by an application. These additional functions may be specified by a more complex decoder implementation of decoders 1189 and 1190 and an expansion of the control signals SNOp 1193 and LNOp 1194. For example, operations on individual data such as shift operations may be specified and more complex operations on multiple input paths, such as compare and addition operations and the like may also be specified.

Figure 12A:
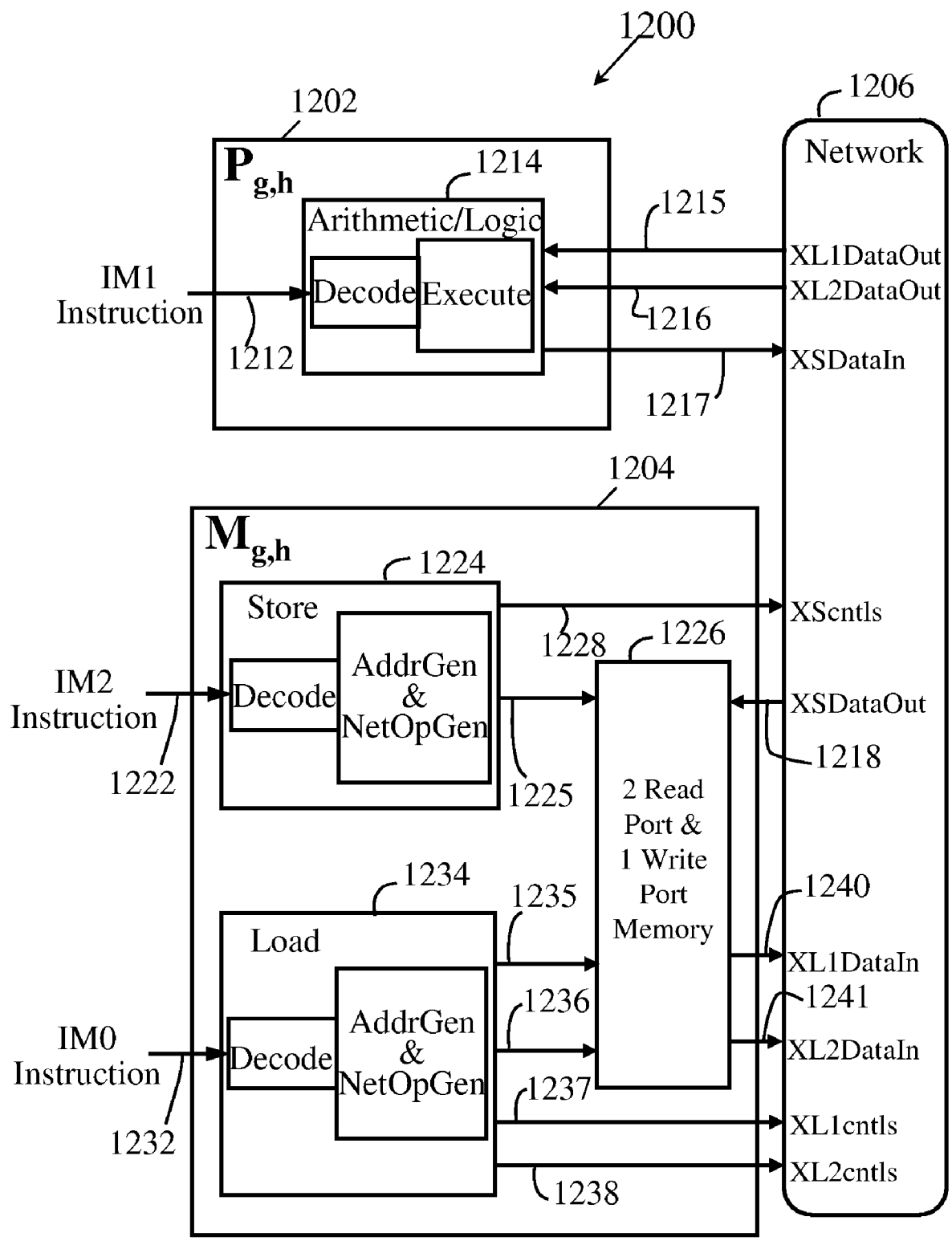
FIG. 12A illustrates Wings processor node made up of an execution node and a memory node in accordance with an embodiment of the present invention.

FIG. 12A illustrates Wings processor node 1200 made up of an execution node 1202 and a memory node 1204 in accordance with an embodiment of the present invention. The split organization of the processor node 1200 allows the execution node 1202 to be placed at the data input and output connections of a WAM store network, such as the WAM16S network 400 of FIG. 4A and a WAM load network, such as the WAM16L network 500 of FIG. 5A. The split organization of the processor node 1200 also allows the memory node 1204 to be placed at the data input and output connections of a WAM store network and a WAM load network. A WAM store network combined with a WAM load network is represented by network 1206.

The execution node 1202 receives arithmetic/logic instructions over an IM1 instruction bus 1212 connected to an arithmetic decode and execution unit 1214. The arithmetic/logic (AL) instructions each have a format such as the AL instruction format 1020 of FIG. 10B. The received AL instruction is decoded and executed using source operands XL1 DataOut 1215 and XL2 DataOut 1216 supplied from the network 1206. The arithmetic decode and execute unit 1214 generates a result XSDataIn 1217 that is sent to the network 1206. The AL instruction itself contains no source or target operand information.

The memory node 1204 receives store instructions over an IM2 instruction bus 1222 connected to a store decode and execute unit 1224. The store instructions each have a format such as the store instruction format 1040 of FIG. 10C. The received store instruction is decoded and executed generating address lines 1225 that are supplied to memory 1226 and controls (XScntls) 1228 supplied to the network 1206. XSDataIn 1217 follows the data path of a WAM store network that is part of the network 1206 and outputs a XSDataOut 1218. The XSDataOut 1218 is connected to the memory 1226 and written to memory 1226 when the store instruction is executed. The Xscntls 1228 provide multiplexer control signals to the store portion of the network 1206, such as the WAM16S network 400 of FIG. 4A, such as multiplexer node 1186 of FIG. 11D.

The memory node 1204 further receives load instructions over an IM0 instruction bus 1232 connected to a load decode and execute unit 1234. The load instructions each have a format such as the load instruction format 1060 of FIG. 10D. The received load instruction is decoded and executed generating load address lines to be output to the memory 1226. For dual load instructions, for example, address lines 1235 and 1236 are generated. Associated with the generated address lines 1235 and 1236 are corresponding control lines XL1cntls 1237 and XL2cntls 1238, respectively. The XL1cntls 1237 and XL2cntls 1238 provide multiplexer control signals to the load portion of the network 1206, such as having two WAM16L networks 500 of FIG. 5A and using a multiplexer node, such as, multiplexer node 1187 of FIG. 11D for each node of the load networks. The two load address lines 1235 and 1236 cause two data operands to be read from memory 1226 and output on XL1DataIn 1240 and XL2DataIn 1241 that are connected to the network 1206. The XL1DataIn 1240 and XL2DataIn 1241 follow a WAM load network path to reach the XL1DataOut 1215 and XLO 2 DataOut 1216, respectively.

By placing the load and store execute units 1234 and 1224 in close proximity to the memory 1226, the load address lines 1235 and 1236 and store address lines 1225 do not have to pass through the network 1206. The control signals XL1cntls 1237, XL2cntls 1238, and XScntls 1228 are used for multiplexer control in network 1206.

Figure 12B:
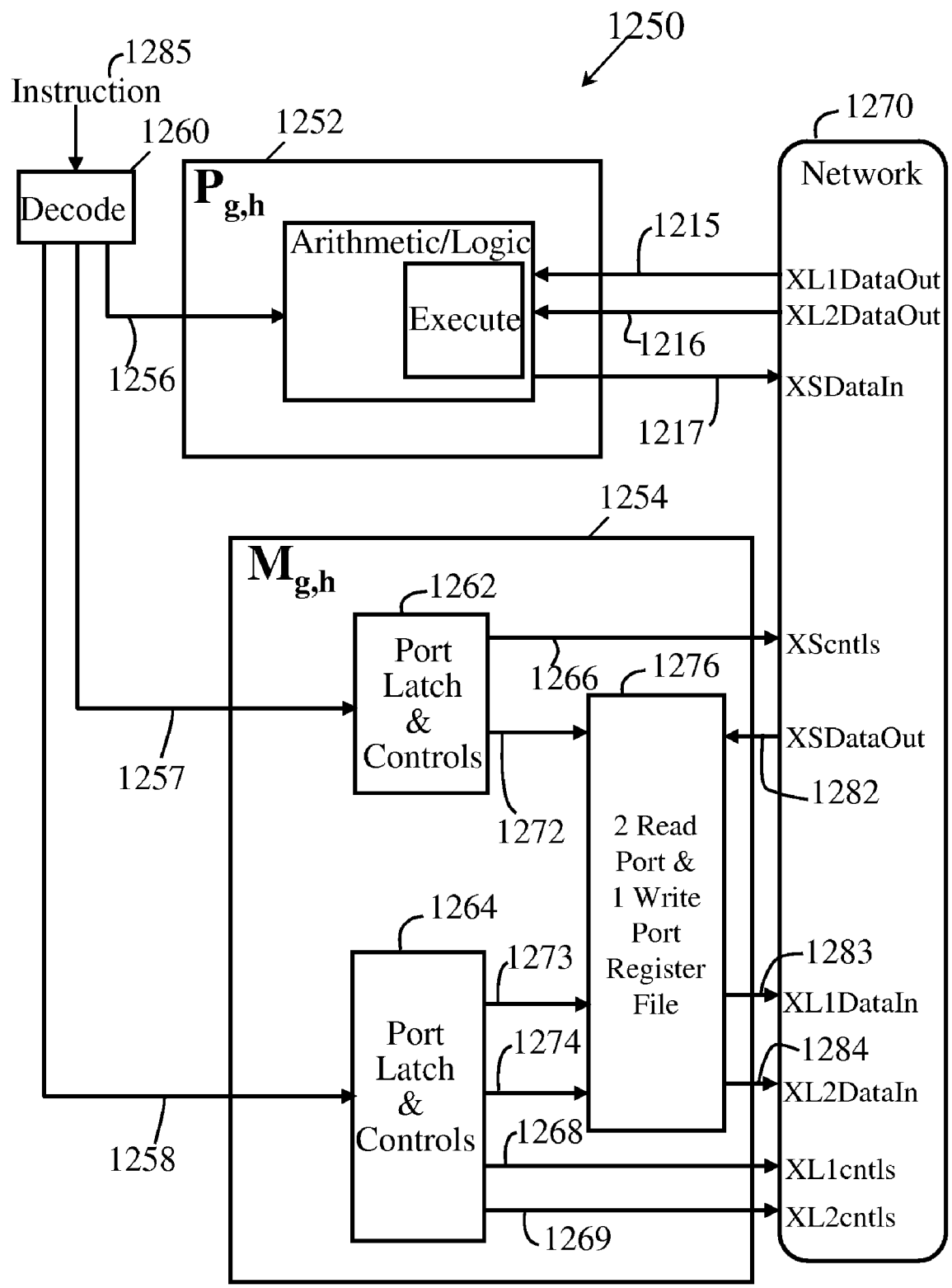
FIG. 12B illustrates processor node made up of an execution node and a memory node in accordance with an embodiment of the present invention.

FIG. 12B illustrates processor node 1250 made up of an execution node 1252 and a memory node 1254 in accordance with an embodiment of the present invention. The execution node 1252 does not have a decoder and receives decoded arithmetic/logic instruction control signals 1256 from an external instruction decoder such as decoder 1260. The memory node 1254 does not have a decoder and receives decoded store and load instructions control signals 1257 and 1258, respectively, from an external instruction decoder such as decoder 1260. The store and load instruction control signals 1257 and 1258 are received in port latch and control units 1262 and 1264, respectively. The port latch and control unit 1262 supplies the XScntls 1266 to a network 1270. The port latch and control unit 1264 supplies the XL1cntls 1268 and XL2cntls 1269 to the network 1270. The port latch and control unit 1262 supplies the write address 1272 to a multiport memory, such as memory 1276. Data received from the network on XSDataOut 1282 is stored in the multiport memory 1276. The port latch and control unit 1264 supplies the read addresses 1273 and 1274 to a multiport memory, such as the memory 1276 to access two data values. The data values are supplied to the network on XL1DataIn 1283 and XL2DataIn 1284. In this fashion, single instructions, such as instructions 1285 may be separately decoded and use the features and advantages of the present invention.

While the present invention is disclosed in a presently preferred context, it will be recognized that the teachings of the present invention may be variously embodied consistent with the disclosure and claims. By way of example, the present invention is applicable to register based RISC type processors acting as the processor nodes that communicate through a shared global memory. In another example, the network 1206 of FIG. 12A may be implemented with various types of networks while maintaining the split organization of the processor node 1200 embodiment of the present invention. It will be recognized that the present teachings may be adapted to other present and future architectures to which they may be beneficial.

I claim:

1. A multiprocessing system operative to execute arithmetic instructions comprising:

a first memory node (MN) comprising a first instruction bus that receives only memory read operation type instructions, a second instruction bus that receives only memory write operation type instructions, and a memory, the memory having a memory output coupled to a first MN output and a memory input coupled to a first MN input, the first memory node decodes and executes a memory read instruction which accesses a source operand from the memory and provides it to the first MN output and the first memory node decodes and executes a memory write instruction which stores a result data value available from the first MN input in the memory; and an arithmetic logic unit (ALU) node comprising a third instruction bus that receives only arithmetic operation type instructions and an execute unit (EU), the EU having an EU input coupled to an ALU node input and an EU output coupled to an ALU node output, the ALU node input coupled through a first network to a plurality of memory nodes including the first MN output and the ALU node output coupled through a second network to the plurality of memory nodes including the first MN input, the ALU node decodes and executes an arithmetic instruction that operates on the source operand provided as an input to the execution unit after a latency to fetch the source operand from the memory through the first network by the start of the execution cycle for the arithmetic instruction, the source operand provided in response to the execution of the memory read instruction, and the EU generates a result of the execution of the arithmetic instruction by the start of the execution cycle for the memory write instruction, the result provided through the second network to the first MN input as the result data value to be stored in the memory in response to the execution of the memory write instruction.

2. The multiprocessing system claim 1 wherein the first memory node further comprises:

a read instruction decode and execute unit coupled to the first instruction bus and the memory; and a write instruction decode and execute unit coupled to the second instruction bus and the memory, wherein the first memory node is placed at a first point of connection at which the first MN output is coupled to an input of the first network and the first MN input is coupled to an output of the second network, and the ALU node is placed at a second point of connection at which the ALU node input is coupled to an output of the first network and the ALU node output is coupled to an input of the second network.

3. The multiprocessing system of claim 1 further comprises:
   network control signals provided for controlling a read data path the source operand is to follow through the first network in response to information contained in the memory read instruction and for controlling a write data path the result is to follow through the second network in response to information contained in the memory write instruction, the network control signals provided by the first memory node.

4. The multiprocessing system of claim 3 wherein the network control signals are made up of network read control signals and network write control signals, the network read control signals control the read data path from the first MN output to the ALU node input and are based on the memory read instruction and the network write control signals control the write data path from the ALU node output to the first MN input and are based on the memory write instruction.

5. The multiprocessing system of claim 1 wherein the memory is a multiport memory.

6. The multiprocessing system of claim 1 wherein the memory is a multiport register file.

7. The multiprocessing system of claim 1 wherein the arithmetic instruction has a first length, the arithmetic instruction is without an arithmetic instruction specification for designating a source operand storage address and without an arithmetic instruction specification for designating a result destination storage address, the memory read instruction has a second length, the memory read instruction is without a read instruction specification for designating a result destination storage address, and the memory write instruction has a third length, the memory write instruction is without a write instruction specification for designating a source operand storage address, wherein the first length, the second length, and the third length are independently sized in length depending upon the required action specified in the arithmetic instruction, the memory read instruction and the memory write instruction, respectively.

8. The multiprocessing system of claim 7 wherein the first length, the second length, and the third length are not limited to a power of 2 number of bits.

9. The multiprocessing system of claim 1 further comprises:
   a plurality of ALU nodes, each ALU node receiving only arithmetic operation type instructions, wherein each memory node of the plurality of memory nodes receives only memory read operation type instructions and memory write operation type instructions,
   the first network couples the plurality of ALU nodes with the plurality of memory nodes providing read data paths for source operands from one or more MN outputs to one or more ALU node inputs, and
   the second network couples the plurality of ALU nodes with the plurality of memory nodes providing write data paths for results from one or more ALU node outputs to one or more MN inputs.

10. The multiprocessing system of claim 9 wherein the memory read instruction specifies in a read direction selection field information for controlling the first network to provide a path through the first network for a source operand from the first MN output connected by the first network to an input of a selected ALU node and wherein the memory write instruction specifies in a write direction selection field information for controlling the second network to provide a path through the second network for a result from a selected ALU node output connected by the second network to the first MN input.

11. The multiprocessing system claim 1 wherein the first memory node further comprises:
    a read instruction decode and execute unit coupled to the memory and configured for decoding and executing the memory read instruction having a read instruction format containing read operation information and source operand memory address information for reading the source operand, and without a read instruction specification for designating a storage address destination location for the source operand read from the memory.

12. The multiprocessing system of claim 1 wherein the first memory node further comprises:
    a write instruction decode and execute unit coupled to the memory and configured for decoding and executing the memory write instruction having a write instruction format containing write operation information and destination memory address information for writing the result data value, and without a write instruction specification for designating a storage address source location for the result data value.

13. A memory node cooperating with an execution node to execute an arithmetic instruction, the memory node comprising:
    a memory having a load address input, a store address input, a store input data port, and a load output data port, the store input data port coupled to a result port of an execution node, and the load output data port coupled to an input operand port of the execution node;
    a load decode and execute unit receiving only memory load operation type instructions and coupled to the load address input and fetching an input operand from the memory and providing the input operand through the load output data port to the input operand port of the execution node in response to executing a load instruction received in the load decode and execute unit; and
    a store decode and execute unit receiving only memory store operation type instructions and coupled to the store address input and storing a result received through the store input data port from the result port of the execution node in response to executing a store instruction received in the store decode and execute unit, wherein an arithmetic instruction is executed in the execution node when the input operand has been received at the input operand port of the execution node in response to the execution of the load instruction, the execution node operating on the input operand from the memory and generating the result, the result stored in the memory in response to the execution of the store instruction, wherein the store input data port coupled to the result port of the execution node is coupled by a store path selected through a first network and the selection of the store path is based on information explicitly contained in the store instruction, the first network coupled to a plurality of memory nodes and a plurality of execution nodes, and wherein the load output data port coupled to the input operand port of the execution node is coupled by a load path selected through a second network and the selection of the load path is based on information explicitly contained in the load instruction, the second network coupled to the plurality of memory nodes and the plurality of execution nodes.

14. The memory node of claim 13 wherein the execution node comprises:
an arithmetic instruction decode unit for receiving and decoding an arithmetic instruction; and
an execution unit operating, in response to the arithmetic instruction, on the input operand received on the input operand port to generate a result value that is made available at the result port.

15. The memory node of claim 13 wherein the store path is selected from among more than two selectable store paths by control signals supplied to the first network, the control signals generated by decoding and executing the store instruction.

16. The memory node of claim 13 wherein the load path is selected from among more than two selectable load paths by control signals supplied to the second network, the control signals generated by decoding and executing the load instruction.

17. The memory node of claim 13 wherein the load instruction utilizes a load instruction format having load operation information and source storage operand address information, and without a load instruction specification for designating a storage address destination location for the source operand read from the memory and wherein the store instruction utilizes a store instruction format having store operation information and result storage address information, and without a store instruction specification for designating a storage address source location for the result.

18. The memory node of claim 13 wherein the arithmetic instruction utilizes an arithmetic instruction format having execution unit operation information without an arithmetic instruction specification for designating a source operand storage address and without an arithmetic instruction specification for designating a result destination storage address.

19. A method to execute an arithmetic instruction comprising:
executing a load instruction in a first data memory node in a first execution cycle which fetches an operand from a data memory and provides the fetched operand to an arithmetic execution unit through a first network coupling between a plurality of data memory nodes and the arithmetic execution unit, wherein the execution of the load instruction selects a first path the operand follows through the first network coupling to the arithmetic execution unit;
executing an arithmetic instruction in a second execution cycle following the first execution cycle with the fetched operand received at the start of the second execution cycle from the first path through the first network coupling as input to the arithmetic execution unit operating in response to the arithmetic instruction which generates a result; and
executing a store instruction in a third execution cycle following the second execution cycle which stores the result in the data memory, the result received from the arithmetic execution unit through a second network coupling between the plurality of data memory nodes and the arithmetic execution unit, the result is received in time to be stored in the data memory, wherein the execution of the store instruction selects a second path the result follows through the second network coupling to the first data memory node.

20. The method of claim 19 wherein the load instruction utilizes a load instruction format having load operation information and source operand storage address information, and without a load instruction specification for an operand destination storage address, the store instruction utilizes a store instruction format having store operation information and result destination storage address information, and without a store instruction specification for a result source storage address, and the arithmetic instruction utilizes an arithmetic instruction format having execution unit operation information without an arithmetic instruction specification for a source operand storage address or a result destination storage address.

21. The method of claim 19 further comprising:
receiving the load instruction in a load execution unit on a first instruction path from a load instruction memory that holds only load operation type instructions;
receiving the store instruction in a store execution unit on a second instruction path from a store instruction memory that holds only store operation type instructions, the second instruction path separate from the first instruction path; and
receiving the arithmetic instruction in the arithmetic execution unit on a third instruction path from an arithmetic instruction memory that holds only arithmetic operation type instructions, the third instruction path separate from the second instruction path and separate from the first instruction path.

22. A processing system for executing instructions comprising:
a data memory;
a load processor which executes memory read operation type instructions;
a first store processor which executes memory write operation type instructions; and
a first execution processor which executes arithmetic operation type instructions, wherein a memory read operation type instruction is executed in the load processor which reads a source operand from the data memory, the source operand provided through a first network coupled to a plurality of execution processors to an input port of the first execution processor, an arithmetic operation type instruction begins execution in the first execution processor which operates on the source operand at the start of an execution cycle and generates a result by the end of the execution cycle, the result provided through a second network coupled to a plurality of store processors to an input port of the first store processor in time for the result to be written to the data memory in a store cycle following the execution cycle in response to the execution of a memory write operation type instruction.

23. The processing system of claim 22 wherein the source operand follows a read path through the first network wherein the read path is selected in response to the execution of the memory read operation type instruction and the result follows a write path through the second network wherein the write path is selected in response to the execution of the memory write operation type instruction.

24. A multiprocessor system for executing instructions comprising:
a first plurality of data memories, each data memory holding operands and results and each data memory having an operand output and a result input;
a plurality of load decode and execute units, associated with each data memory is a respective load decode and execute unit coupled to the associated data memory and configured for receiving a load instruction over a load instruction bus and executing the received load instruction which fetches an operand from the associated data memory to the operand output;

a plurality of store decode and execute units, each store decode and execute unit coupled to the associated data memory and configured for receiving a store instruction over a store instruction bus and executing the received store instruction which stores a result in the associated data memory, the result provided from the result input;

a network for load operations connected to each operand output of the first plurality of data memories, the fetched operand follows a selected load path through the network for load operations, and the selection of the load path is based on information explicitly contained in the load instruction;

a network for store operations connected to each result input of the first plurality of data memories, the result follows a selected store path through the network for store operations, and the selection of the store path is based on information explicitly contained in the store instruction; and a plurality of arithmetic instruction (AI) decode and execute units, each AI decode and execute unit having an AI input and an AI output, the AI input coupled through the network for load operations to the operand output of a data memory associated with the selected load path and the AI output coupled through the network for store operations to the result input of a data memory associated with the selected store path, each AI decode and execute unit configured for receiving a respective arithmetic/logic (AL) instruction over a respective AL instruction bus and executing the received AL instruction when the fetched operand has been provided through the network for load operations to the AI input in response to the execution of the load instruction and each AI decode and execute unit generating a result value in response to executing the received AL instruction, the result value provided to the AI output then through the network for store operations to the result input as the result and stored in the data memory associated with the selected store path in response to the store instruction.

25. The multiprocessor system of claim 24 wherein the received load instruction utilizes a load instruction format containing load operation information and source storage operand address information, and without a load instruction specification for a destination storage address and the received store instruction utilizes a store instruction format containing store operation information and destination storage address information, and without a store instruction specification for a source operand storage address.

26. The multiprocessor system of claim 24 wherein the received AL instruction utilizes an AL instruction format containing execution unit operation information without an AL instruction specification designating a source operand storage address or a result destination storage address.

27. The multiprocessor system of claim 24, wherein the load instruction is issued in a software pipeline and executed and the store instruction is issued in the software pipeline and executed, the store instruction writes an operand from a first AI decode and execute unit to one of the data memories and the load instruction fetches the operand from said one of the data memories to a second AI decode and execute unit.

28. The method of claim 19, wherein the first path through the first network coupling is selected based on explicit information contained in the load instruction and wherein the second path through the second network coupling is selected based on explicit information contained in the store instruction.

29. The multiprocessor system of claim 24 wherein each load decode and execute unit coupled to the associated data memory, each store decode and execute unit coupled to the associated data memory, and the associated data memory comprises a memory node of the multiprocessing system, wherein a processor node of the multiprocessor system comprises a memory node and an AI decode and execute unit.

* * * * *